United States Patent
Bourland et al.

(10) Patent No.: US 11,823,115 B2
(45) Date of Patent: *Nov. 21, 2023

(54) INTERMEDIATED SHIPPING LOGISTICS SYSTEM FOR FACILITATING DELIVERY APPOINTMENT SCHEDULING WITH OUTSOURCED CARRIER SYSTEMS

(71) Applicant: CONVEY, LLC, Austin, TX (US)

(72) Inventors: Anna Leigh Bourland, Austin, TX (US); Matthew Howitt, Austin, TX (US); Sebastian Kuruvilla Karivelithara, Austin, TX (US); Olivier Jean Marie Modica, Austin, TX (US); James Robertson Carlin, Jr., Austin, TX (US)

(73) Assignee: CONVEY, LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/100,445

(22) Filed: Jan. 23, 2023

(65) Prior Publication Data

US 2023/0162131 A1 May 25, 2023

Related U.S. Application Data

(63) Continuation of application No. 16/915,507, filed on Jun. 29, 2020, now Pat. No. 11,587,018.

(Continued)

(51) Int. Cl.
*G06Q 10/0833* (2023.01)
*G06Q 10/0835* (2023.01)
(Continued)

(52) U.S. Cl.
CPC ..... *G06Q 10/0833* (2013.01); *G06F 16/9537* (2019.01); *G06F 16/9558* (2019.01); *G06Q 10/0835* (2013.01)

(58) Field of Classification Search
CPC ............ G06Q 10/0833; G06Q 10/0835; G06F 16/9537; G06F 16/9558
See application file for complete search history.

(56) References Cited

U.S. PATENT DOCUMENTS 7,177,825 B1 * 2/2007 Borders ............... G06Q 30/016
705/28
7,233,907 B2 6/2007 Young
(Continued)

OTHER PUBLICATIONS

Han, S., Zhao, L., Chen, K., Luo, Z.-wei, Mishra, D. (2017). Appointment scheduling and routing optimization of attended home delivery system with Random Customer Behavior. European Journal of Operational Research, 262(3), 966-980. https://doi.org/10.1016/j.ejor.2017.03.060 (Year: 2017).*

(Continued)

*Primary Examiner* — Shannon S Campbell
*Assistant Examiner* — Manal A. Alsamiri
(74) *Attorney, Agent, or Firm* — MARSHALL, GERSTEIN & BORUN LLP

(57) ABSTRACT

A computer system that queries a carrier computer system of a carrier associated with a shipment to determine whether delivery appointment scheduling is available for the shipment, based on a determination that the delivery appointment scheduling is available, generates and transmits a link for a dynamically generated web page to the recipient; receives a signal indicating activation of the link; obtains scheduling information for the shipment from the carrier computer system; dynamically generates page code for the web page and transmits the web page to a client, the web page displaying information associated with the shipment and digital assets that visually correspond to the shipper of the shipment and including a scheduling tool; receives a selection of a time slot from the scheduling tool; and communicates with the carrier computer system to update (Continued)

the carrier computer system with the time slot to schedule delivery of the shipment to the recipient.

20 Claims, 16 Drawing Sheets

Related U.S. Application Data

(60) Provisional application No. 62/868,552, filed on Jun. 28, 2019.

(51) Int. Cl.
*G06F 16/9537* (2019.01)
*G06F 16/955* (2019.01)

(56) References Cited

U.S. PATENT DOCUMENTS

| | | | |
|---|---|---|---|
| 7,827,118 B1* | 11/2010 | Smith, III | G06Q 10/0631 |
| | | | 705/333 |
| 2002/0165729 A1* | 11/2002 | Kuebert | G06Q 10/0833 |
| | | | 705/338 |
| 2004/0030604 A1* | 2/2004 | Young | G06Q 30/02 |
| | | | 705/307 |
| 2006/0235739 A1* | 10/2006 | Levis | G06Q 10/08 |
| | | | 705/1.1 |
| 2009/0094085 A1 | 4/2009 | Kantarjiev et al. | |
| 2010/0324959 A1* | 12/2010 | Templeton | G06Q 10/08 |
| | | | 705/14.1 |
| 2012/0233085 A1* | 9/2012 | Zimberoff | G06Q 30/06 |
| | | | 705/330 |
| 2014/0337246 A1* | 11/2014 | Williams | G06Q 30/0601 |
| | | | 705/336 |
| 2015/0081587 A1* | 3/2015 | Gillen | G06Q 10/08355 |
| | | | 705/338 |
| 2016/0042318 A1* | 2/2016 | Goodman | G06Q 50/28 |
| | | | 705/330 |
| 2016/0210591 A1* | 7/2016 | Lafrance | G06Q 10/047 |
| 2017/0255903 A1 | 9/2017 | Chowdhry et al. | |
| 2018/0357736 A1 | 12/2018 | Sun | |
| 2019/0213538 A1 | 7/2019 | Bebout et al. | |
| 2020/0118071 A1 | 4/2020 | Venkatesan et al. | |
| 2020/0134545 A1 | 4/2020 | Appel | |
| 2020/0342398 A1 | 10/2020 | Aggarwal et al. | |
| 2020/0410441 A1 | 12/2020 | Bourland et al. | |

OTHER PUBLICATIONS

International Application No. PCT/US2021/051450, International Search Report and Written Opinion, dated Oct. 26, 2021.
Andreas Balster, An ETA Prediction Model for Intermodal Transport Networks Based on Machine Learning, May 11, 2020, Springer (Year: 2020).
Aurangabadkar, Sumedha, Support Vector Machine Based Classification System for Classification of Sport Articles, IEEE, Apr. 3, 2014 (Year: 2014).
Han, S., Zhao, L., Chen, K., Luo, Z.-wei, & Mishra, D. (2017). Appointment scheduling and routing optimization of attended home delivery system with Random Customer Behavior. European Journal of Operational Research, 262(3), 966-980. https://doi.org/10.1016/j.ejor.2017.03.060 (Year: 2017).

* cited by examiner

| id (202) | carrier_name (204) | tracking_number (206) | Status (208) | Exception Type (210) | Origin (212) | Destination (214) | Notification (216) |
|---|---|---|---|---|---|---|---|
| 1000 | Ace | 123123 | IN_TRANSIT | NULL | AUSTIN, TX | DALLAS, TX | SMS {number} |
| 1001 | APS | 456456 | IN_TRANSIT | NULL | DALLAS, TX | AUSTIN, TX | SMS {number} |
| 1002 | APS | 456457 | IN_TRANSIT | Held_At_Terminal | DENVER, CO | ALEXANDRIA, VA | SMS {number} |
| 1003 | PackEx | 111111 | IN_TRANSIT | NULL | LOS ANGELES, CA | SAN FRANCISCO, CA | email {email address} |

*FIG. 2A*

| ID | SHIPMENT_ID | STATUS | EXCEPTION_TYPE | CREATED_DATETIME |
|---|---|---|---|---|
| 2001 | 1000 | SCHEDULED | NULL | 2018-18-20T1:13 |
| 2002 | 1000 | IN_TRANSIT | HELD_AT_TERMINAL | 2018-12-21T13:05 |
| 2003 | 1000 | IN_TRANSIT | NULL | 2017-12-23T06:40 |

*FIG. 2B*

| id 252 | carrier_name 254 | tracking_number 256 | delivery_scheduling 258 | delivery_appointment 260 |
|---|---|---|---|---|
| 1000 | Ace | 123123 | {<br>"appointment_required":true,<br>"scheduling_available":false<br>} | {<br>"appointment_date":"2019-03-01",<br>"appointment_end_time":"13:00:00",<br>"appointment_begin_time":"9:00:00"<br>} |
| 1001 | APS | 456456 | {<br>"appointment_required":true,<br>"scheduling_available":true<br>} | {<br>"appointment_date":"2019-03-04",<br>"appointment_end_time":"14:00:00",<br>"appointment_begin_time":"10:00:00"<br>} |
| 1002 | APS | 456457 | {<br>"appointment_required":true,<br>"scheduling_available":true<br>} | {<br>"appointment_date":null,<br>"appointment_end_time":null,<br>"appointment_begin_time":null<br>} |
| 1003 | PackEx | 111111 | {<br>"appointment_required":true,<br>"scheduling_available":false<br>} | {<br>"appointment_date":null,<br>"appointment_end_time":null,<br>"appointment_begin_time":null<br>} |

*FIG. 2C*

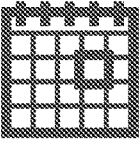

FIG. 7

Furniture Place<alerts+furniture_place@getconvey.com>
to me

| | Delivery Appointment | Agenda |
|---|---|---|
| March 4 | When: March 4, 2019<br>Who: Furniture_Place<br>Add to calendar>> | 10:00am    Delivery Appointment<br>No Later Events |

802

Furniture Place

You have scheduled a delivery appointment for you Furniture Place shipment with APS for March 4 at 10:00 am To make changes to your delivery address or to reschedule your appointment, call APS at (555) 555-5555

810   View Details

800 https://tracking.getconvey.com/furnitureplace/APSC?456456

FIG. 8

INTERMEDIATED SHIPPING LOGISTICS SYSTEM FOR FACILITATING DELIVERY APPOINTMENT SCHEDULING WITH OUTSOURCED CARRIER SYSTEMS

CROSS-REFERENCE TO RELATED APPLICATIONS

This application is a continuation application of U.S. patent application Ser. No. 16/915,507, filed Jun. 29, 2020, which claims priority benefit to U.S. Provisional Patent Application No. 62/868,552, filed Jun. 28, 2019. These applications are hereby fully incorporated by reference in their entireties.

BACKGROUND

Retailers and other shippers of goods often outsource delivery to dedicated carriers. Shippers are increasingly using cloud-based systems to manage shipments and provide shipment tracking data to recipients. Despite the convenience of such systems, online shipping management systems suffer shortcomings when it comes to shipments that require a delivery appointment.

In certain circumstances, a carrier may require that the intended recipient for a shipment schedule a delivery appointment with the carrier. In a typical scenario, even if a shipment is being managed or tracked by an online shipping management system, a terminal worker calls the recipient, gives available delivery slots (e.g., "we can deliver sometime Wednesday 1-5 or Thursday 8:00-12:00") and the recipient chooses an available slot in which the item will be delivered. The terminal worker then schedules the time in the carrier's delivery scheduling system.

Intended recipients often expect items to be delivered by the shipper from which the items were ordered or, at least, by a well-known carrier. Final-mile carriers for large-item shipments, however, are often entities that are not well-known to the public and appear unaffiliated with the shipper. Because many people are hesitant to answer calls from unfamiliar sources, it is becoming increasingly difficult for carriers to schedule delivery appointments. Indeed, three out of ten large-item shipments require multiple contact attempts.

A shipper's shipments may be delivered by any number of final mile carriers, each having its own delivery scheduling system and processes. Oftentimes, these systems do not provide the capability for recipients to schedule shipments online.

SUMMARY

What is desired then are mechanisms for interacting with homogenous delivery scheduling systems to allow online delivery scheduling across carriers and shippers in a manner that maintains the shipper's identity.

One embodiment provides an intermediated system for facilitating delivery appointment scheduling with outsourced carrier systems, the intermediated system. The intermediated system comprises a computer memory storing digital assets visually corresponding to a plurality of shippers and data associating a shipment with a carrier from a plurality of carriers, a shipper from the plurality of shippers, a recipient from a plurality of recipients, a notification channel, and an indication that a delivery appointment is required for the shipment. The intermediated system further comprises a processor and a non-transitory, computer-readable medium storing computer code executable by the processor.

The computer code may include instructions for querying a carrier computer system of the carrier associated with the shipment based on the indication that the delivery appointment is required for the shipment. In particular, the carrier computer system is queried to determine whether delivery appointment scheduling is available for the shipment.

The computer code may further include instructions for generating a signal based on a determination that the delivery appointment scheduling is available for the shipment, the signal indicating that delivery appointment scheduling is available for the shipment. According to one embodiment, generating the signal indicating that delivery appointment scheduling is available for the shipment comprises updating a database record associated with the shipment with an indication that the delivery appointment scheduling is available for the shipment.

The computer code may further include instructions for automatically generating and transmitting to the recipient via the notification channel associated with the shipment, a notification that includes a link for a web page for the shipment. According to one embodiment, the link for the web page for the shipment comprises an indication of the shipper, an indication of the carrier, and an indication of the shipment. Further, according to one embodiment, generating the notification may include determining the notification channel associated with the shipment and populating a template for the notification channel with the link and additional content such as, for example, digital assets of the shipper.

A signal indicating activation of the link may be received. The computer may include instructions for obtaining scheduling information for the shipment from the carrier computer system. According to one embodiment, the scheduling information comprises a plurality of available time slots.

The computer code may further include instructions for dynamically generating page code for a web page for the shipment and transmitting the web page for the shipment to a client. According to one embodiment, the web page for the shipment displays information associated with the shipment and a first digital asset that visually corresponds to the shipper associated with the shipment. The web page may have the look and feel of a web page provided by the shipper. The web page may include directly or by reference a scheduling tool to allow a user to select a time slot based on the scheduling information.

The computer code may include instructions for receiving a selection of the time slot based on user interaction with the scheduling tool and communicating with the carrier computer system to update the carrier computer system with the time slot, to schedule delivery of the shipment to the recipient.

It can be noted that in some embodiments, the scheduling information from the carrier computer system is maintained only in volatile memory until the user selects a time slot. The selected time slot can then be persisted, by for example, adding an indication of the selected time slot to a database record associated with the shipment.

According to one embodiment, the computer memory is configured with carrier-specific status mappings, the carrier-specific status mappings mapping carrier-specific status codes for the plurality of carriers to a delivery scheduling requirement. The computer code may comprise instructions for receiving a carrier-specific status code for the shipment, determining that the delivery appointment is required for the shipment based on the carrier-specific status mappings, and based on a determination that the delivery appointment is required for the shipment, updating a database record associated with the shipment with the indication that the delivery appointment is required for the shipment. In accordance with one embodiment, determining that the delivery appointment is required for the shipment based on the carrier-specific status mappings comprises determining that the delivery appointment is required based on multiple carrier-specific status codes from the carrier associated with the shipment.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, or rearrangements may be made within the scope of the disclosure without departing from the spirit thereof, and the disclosure includes all such substitutions, modifications, additions, or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIG. 2A is a diagrammatic representation of a set of shipping records;

FIG. 2B is a diagrammatic representation of one embodiment of example event records;

FIG. 2C is a diagrammatic representation of one embodiment of example delivery appointment scheduling records;

FIG. 7 is a diagrammatic representation of another embodiment of a notification with respect to a shipment;

FIG. 8 is a diagrammatic representation of another embodiment of a notification with respect to a shipment;

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Embodiments described herein provide an intermediated shipping logistics system that facilitates delivery appointment scheduling with outsourced carrier systems. The intermediated shipping logistics system comprises an online multi-tenant shipping management platform that provides delivery appointment scheduling for multiple shippers and carrier combinations. In some embodiments, the shipping management platform provides a low friction (e.g., three clicks or less) interface for scheduling a delivery appointment. Such interface may use digital assets associated with the shipper and have a look and feel that is consistent with the shipper's web presence. Such digital assets may thus include visually perceptible elements that visually correspond to a shipper. The shipping management system connects to multiple carrier delivery scheduling systems to determine available delivery slots and books the slots for recipients. In another embodiment, the shipping management system determines the slots on behalf of the carrier by applying rules to determine how many appointments a carrier can support in a day. The shipping management platform can also provide automated confirmation and rescheduling. The shipping management platform may further provide customizable delivery windows.

Figure 1:
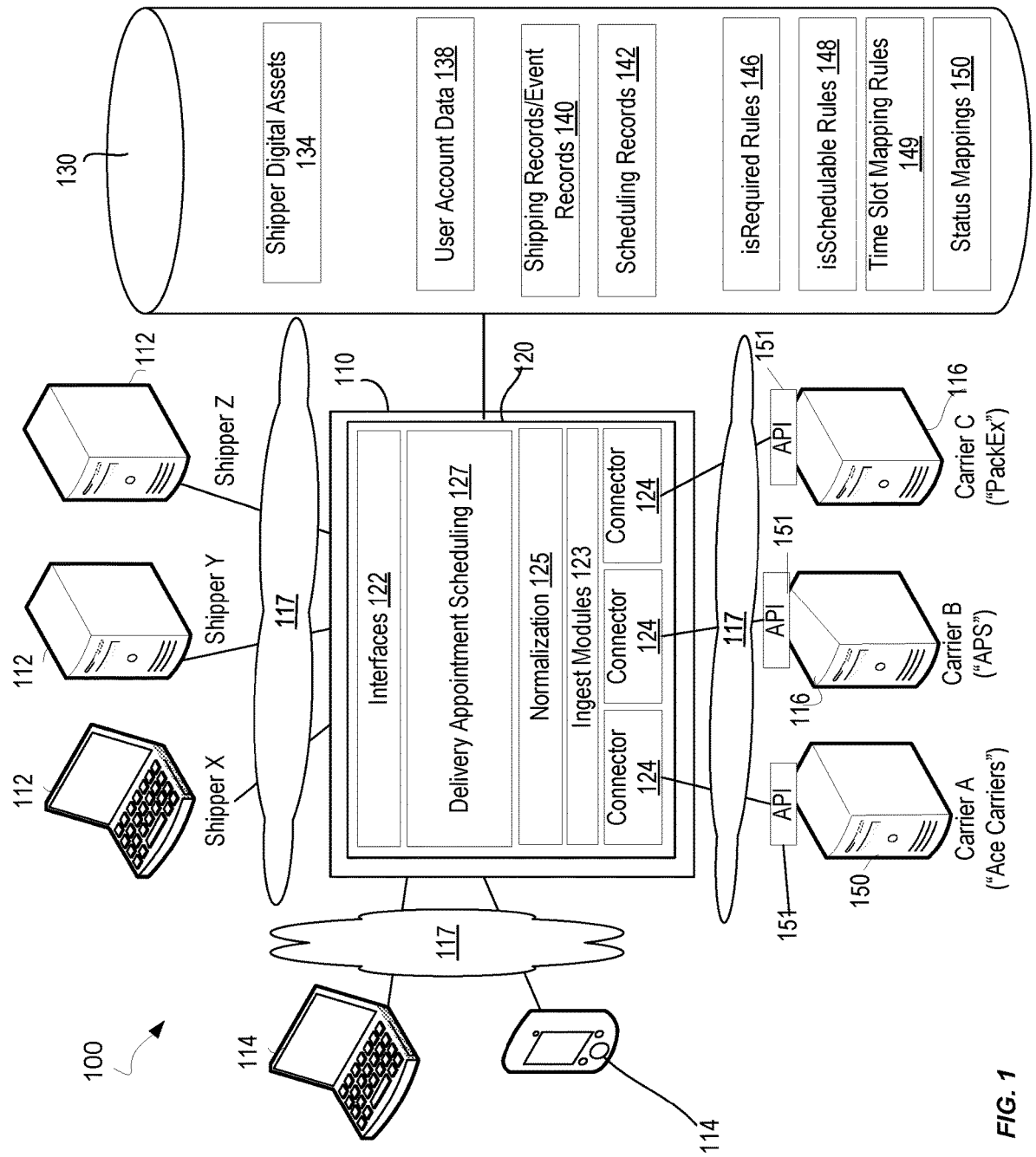
FIG. 1 is a diagrammatic representation of one embodiment of a topology that includes a shipping management platform.

Embodiments of the systems and methods of the present invention may be better explained with reference to FIG. 1, which depicts one embodiment of an intermediated shipping logistics system implemented in a distributed network topology 100. Topology 100 comprises an intermediate shipping management platform 110 bi-directionally coupled to shipper computing systems 112, recipient computer systems 114 and carrier computer systems ("carrier systems") 116 through a network 117. In the embodiment illustrated, shipping management platform 110 connects to shipper computing systems for Shippers X, Y and Z and carrier computer systems 116 for Carriers A, B, C (e.g., hypothetical carriers "Ace Carriers," "APS" and "PackEx"). Shipping management platform 110 may also connect to various other external systems, such as e-commerce servers, ERP systems, TMS systems, ESP/SMS systems, CSR/CRM systems. According to one embodiment, shipping management platform 110 provides a cloud-based system or other network accessible system that multiple shippers can use to manage and track shipments across multiple carriers. Network 117 may be, for example, a wireless or wireline communication network such as the Internet or wide area network (WAN), publicly switched telephone network (PTSN) or any other type of electronic communication link or combination thereof.

Shipping management platform 110 comprises one or more computer systems with central processing units executing instructions embodied on one or more computer readable media where the instructions are configured to perform at least some of the functionality associated with embodiments of the present invention. These applications may include a shipping management application 120 comprising one or more applications (instructions embodied on a computer readable media) configured to implement interfaces 122, ingest modules 123, carrier delivery appointment scheduling connectors 124, normalization module 125 and delivery appointment scheduler 127. In some embodiments, the shipping management platform 110 may be implemented by a shipping management system as described in United States Patent Publication 2019/0213538, entitled "System and Method for Dynamically Scheduling API-Based Shipment Updates Across Carriers," filed Jan. 1, 2019, by Bebout et al. and/or implement various methods described therein. United States Patent Publication 2019/0213538 is hereby fully incorporated herein by reference for all purposes.

Shipping management platform 110 includes a data store 130 storing a variety of information about shippers, carriers and recipients. In particular, during onboarding of shippers, various information about the shippers and digital assets 134 associated with shippers can be stored. The digital assets 134 may include email templates, web page templates, branding assets (images of logos, etc.) or other digital assets so that shipping management platform 110 can provide notifications that have consistent branding with the shipper.

Data store further includes user account data 138. The user account data 138 may include carrier credentials where the carrier credentials include information necessary to retrieve shipment data for the account holder from one or more carrier computer systems 116. The carrier credentials for an account holder/carrier pair (e.g., a shipper/carrier pair) may include a customer number, username and password, secret key, token or other information so that shipping management platform 110 can request shipment data. For example, the account information for Shipper X may include information to log in and request shipment data for Shipper X from Carrier A's system 116, information to log in and request shipment data for Shipper X from Carrier B's system 116, and information to log in and request shipment data for Shipper X from Carrier C's system 116. The carrier credentials may also include information so that shipping management platform 110 can log into a carrier computer system 116 on behalf of the account holders to schedule a pickup, schedule delivery or perform other operations. The carrier credential information may be provided as part of onboarding a shipper or other account holder.

Data store 130 further includes data collected from shipper computer systems 112, recipient computer systems 114 and/or carrier computer systems 116. In particular, data store 130 stores shipping records and event records 140. In general, shipping records can hold a wide variety of information about individual shipments and event records can hold a wide variety of information related to events associated with individual shipments. Shipping management platform 110 may maintain many thousands or millions of shipping records and event records. Some example embodiments of shipping records and event records are discussed in United States Patent Publication 2019/0213538.

Shipping records can hold information about individual shipments. One example of a set of shipping records is illustrated in FIG. 2A. In FIG. 2A, each row represents a shipping record. While only four shipping records are illustrated, shipping management platform 110 may maintain many thousands or millions of shipping records. In the example shown, each shipment has an internal shipment id (column 202) that the shipping management platform 110 uses to identify the shipment. Column 204 identifies the carrier for each respective record. Each shipping record can include a variety of information provided by a shipper computer system 112 or a carrier computer system 116, such as a tracking number (column 206), origin (column 212), destination (column 214), whether the intended recipient requested notifications for the shipment and the preferred notification channel (column 216). A shipping record may also include shipment tracking information, such as a most recent status (column 208) and a most recent exception (column 210). In general, the most recent status and exception for a shipment may be stored in the shipping record for the shipment. Some data in a shipping record may be normalized data A shipping record will typically include more information than is shown in FIG. 2A, which, for clarity, shows just a few exemplary fields. A shipping record may include, for example, scheduling information specifying when to check the carrier API for additional shipment tracking information, the recipient name, address and other information. A shipping record may also include other information provided by the carrier or shipper for shipments including, for example estimated delivery dates, purchase order (PO) numbers, bill-of-lading (BOL) numbers or other information. In one embodiment, for example, the shipper may provide to the shipping management platform data that includes the purchase order PO numbers for shipments. In other cases, the shipper may push this information to the carrier and the shipping management platform can receive it from the respective carrier system (e.g., in a shipment record file or in response to an API call).

Further, shipping records can be associated with specific account holders (e.g., shippers or other entities) of the shipping management platform 110. For example, data store 130 may store account holder records for each account holder that indicate the shipments associated with that account holder. In another embodiment, a shipping record may indicate the account holder with which it is associated. Thus, a particular user will only be able to access the shipping records associated with the account holder for which the user has access.

Event records can hold information related to events for a particular shipment. FIG. 2B illustrates one embodiment of example event records for the shipment having SHIPMENT_ID 1000. Each row represents an event record. While only three event records are illustrated, the shipping management platform 110 can maintain any number of event records for each shipment. In the example shown, each shipment event has internal id (column 230) and an indication of the shipment with which the event is associated (column 232). Shipping event records may store shipment tracking information, such as statuses (column 234) and exceptions (column 236) over the life of a shipment. Exceptions may include normalized exceptions determined from status information provided by a carrier or predicted exceptions generated by shipping management application 120. Further, a shipping event record may include the time and date at which an event was created (column 238). The time and date values can be used to determine the order in which the events occurred since they may not all be received in order.

The shipment event records of FIG. 2B are provided by way of example and shipment event records can store additional or alternative data. For example, a shipment event record may specify a location associated with an event.

Further, data store 130 stores delivery appointment scheduling records 142 for shipments, where the scheduling records 142 include delivery appointment scheduling information. Turning briefly to FIG. 2C, this figure illustrates one embodiment of a set of scheduling records for a set of shipments. In FIG. 2C, each row represents a shipment. While only four records are illustrated, shipping management platform 110 may maintain records for many thousands or millions of shipments.

In the example shown, each shipment has an internal shipment id (column 252) that the shipping management platform uses to identify the shipment. Column 254 identifies the carrier for each respective record. Column 256 includes the tracking code for each respective shipment. Delivery scheduling column 258 contains includes data regarding scheduling delivery appointments. More particularly, in the embodiment illustrated, delivery_scheduling column 258 includes JSON data with the following fields:
  appointment_required: indicates whether the shipment requires a delivery appointment;
  scheduling_available: indicates whether scheduling is available for this shipment (for example, indicates whether online scheduling is available).

Further, in the embodiment illustrated, delivery_appointment column 260 contains JSON data with fields representing the current scheduled date and time range for the shipment's delivery appointment.

It can be noted that, for shipment id 1000, scheduling_available=false, but there is still delivery_appointment information recorded. This may occur in various ways. For example, if a carrier does not support online scheduling but supports delivery appointment scheduling through another channel (e.g., the recipient scheduling an appointment over the phone) and the scheduling information has been provided to shipping management platform 110 (e.g., as an event, via a shipment record received from the carrier). As another example, the shipping management platform may set scheduling available to "false" after storing delivery scheduling data to indicate that the carrier does not support rescheduling.

Further in FIG. 2, both columns 258 and 260 are populated for shipment id 1001 indicating that online scheduling is available, and a delivery appointment has been scheduled. For shipment id 1002, on the other hand, scheduling is available (an appointment can be set), but a delivery appointment has not yet been scheduled. Further, in the example of FIG. 2, column 258 indicates that an appointment cannot be set for shipment id 1003.

Returning to FIG. 1, data store 130 further stores rules for determining if delivery appoint scheduling is required for a shipment (isRequired rules 146) and rules for determining if delivery appointment scheduling is available for a shipment (isSchedulable rules 148). In various embodiments, the isRequired rules 146 and isSchedulable rules 143 are carrier dependent. Data store 130 further stores time slot mapping rules 149 to map carrier-specific available time slot data to page code or other interface for selecting a delivery time slot. Data store 130 further stores carrier-specific status mappings 150 used by normalization module 125.

Carrier computer systems 116 provide shipment-specific information, including shipment tracking data through a variety of mechanisms. Data sources for shipment-specific information include, but are not limited to, shipment record files (e.g., spreadsheets, comma-separated files, other structured files, etc.), public APIs provided by the carriers, data scraped from web sites, data manually received from carriers, data pushed from a carrier, etc. For a given carrier, data may be acquired in multiple ways and integrated together to provide a combined view of the data compared to getting data from a single source. In the embodiment illustrated, each carrier computer system 116 provides an API 151 with endpoints for collecting shipment-specific tracking information and for facilitating delivery appointment scheduling.

When integrating shipping management platform 110 with a carrier computer system 116, a "discovery process" occurs to make a determination of what combination of data sources will give the best overall information. This discovery process could take the form of research, manually consulting with the carrier, etc. Ingest modules 123 can then be configured to gather shipment specific data from that carrier. For a given carrier, data may be acquired from multiple sources and integrated together. Some example embodiments of collecting shipment-specific information, such as tracking data, via APIs, document interchanges, web pages and other sources are discussed in United States Patent Publication 2019/0213538. Furthermore, carrier delivery appointment scheduling connectors 124 can be created to interact with the carrier computer systems 116 to facilitate delivery appointment scheduling as discussed below. In some embodiments, carrier delivery appointment scheduling connectors 124 are a subset of ingest modules 123. In addition, isRequired rules 146, isSchedulable rules 148, carrier-specific status mappings 150 and other rules can be defined to support various functionality with respect to each carrier.

Shipping management platform 110 utilizes interfaces 122 configured to, for example, receive and respond to queries from users at shipper computer systems 112 or recipient computer systems 114, interface with carrier computer systems 116, and interface with other external, obtain data from or provide data obtained, or determined, by shipping management platform 110 to any of shipper computer systems 112, recipient computer systems 114, carrier computer systems 116 or external systems. It will be understood that the particular interface 122 utilized in a given context may depend on the functionality being implemented by shipping management platform 110, the type of network 117 utilized to communicate with any particular entity, the type of data to be obtained or presented, the time interval at which data is obtained from the entities, the types of systems utilized at the various entities, etc. In some embodiments, these interfaces may include, for example web pages, web services or application programming interfaces (APIs). In some embodiments, shipping management platform 110 provides an API so that online ordering systems can be integrated with shipping management platform 110.

Shipping management platform 110 can become aware of shipments from several sources. According to one embodiment, shipping management platform 110 provides an interface 122 through which a user at a shipper computer system 112 can define a shipment. An ingest module 123 can be configured to receive and process order-level information from shippers in the form of data files exchange or Web Service API integration and relevant shipment data. The shipment data may include an account holder if different than the shipper (e.g., a drop shipper can indicate or it may be implicit that the shipment is on behalf of a particular retailer), recipient, from address (shipper), to address (consignee), weight, product class and dimensions and other information. Shipping management platform 110 can provide carrier selections to the user so that the user may select a final shipper or shipping management platform 110 can automatically select the carrier. In any case, if a shipper user uses the shipping management platform 110 to schedule a shipment, then shipping management platform 110 will be aware of the shipment and can create a shipping record and corresponding initial event record and scheduling record 142 when the shipment is executed by the shipping management platform.

In other cases, a shipper can initiate a shipment directly with a carrier and provide the shipment data, such as a tracking number and other shipment information (e.g., whether an intended recipient should receive notifications and the contact information for the intended recipient) to shipping management platform 110 (e.g., via a user interface). Using information about the shipment provided by the shipper, shipping management platform 110 can request shipment information from the carrier computer system 116.

In other embodiments, shipping management platform discovers shipments associated with an account holder from information provided by a carrier computer system 116 and obtains shipment information from the carrier computer system 116. The carrier can make the shipping management platform 110 aware of an account holder's shipments via shipment report files, notifications, responses to requests, or other mechanism. If the shipping management platform 110 is configured to become aware of a shipment from multiple sources (via notifications from a carrier and from a user, for example) the system can determine that the information relates to an existing shipping record (for example, due to the use of a unique reference number and destination postal code), and will integrate the information, rather than create separate records for the same shipment.

During shipment, carrier computer systems 116 provide shipment tracking data that indicates the status shipments (e.g., when a shipment was ready for pickup, when the shipment was picked up, check in/check out at various tracking locations, when the shipment was actually delivered and other information). Each tracking update can contain one or more of status (status code or other description), location and time information for a shipment. In some cases, a tracking update may indicate an exception (event that delays or otherwise adversely affect a shipment). Exception data may include, for example, data that indicates that a pickup was missed, a shipment was delivered late, a shipment was damaged, etc.

When processing shipment-specific information for a shipper, shipping management platform 110 can identify if the shipment is a new shipment (a shipment for which there is no shipping record) or an existing shipment. If the shipment is a new a shipment, shipping management platform 110 can create a shipping record and initial event record and associated delivery appointment scheduling record 142 for the shipment. In general, shipments can easily be identified as new or existing shipments because carriers assign each shipment a unique shipment or tracking number.

Normalization module 125 is configured to map between the carrier specific formats used by each carrier computer system 116 and normalized data. In accordance with one embodiment, normalization module 125 includes normalization rules (e.g., carrier-specific status mappings 150) to map the carrier tracking codes in the received carrier data to (internal) normalized tracking codes, examples of which are discussed in United States Patent Publication 2019/0213538.

According to one embodiment, normalization module 125 processes carrier-specific status mappings 150 that map specific status code values or status description values or both to one of a number of normalized statuses along with an exception category when appropriate. In general, the statuses correspond to various stages of a shipment (e.g., pickup scheduled, picked up, in-transit, available for pick up, out for delivery, delivered). One embodiment of normalizing carrier tracking data to normalized status codes is described in United States Patent Publication 2019/0213538.

Delivery appointment scheduler 127 processes status codes received from carriers, normalized status codes or other information according to isRequired rules 146 to determine if a delivery appointment is required for a shipment. For shipments for which a delivery appointment is required, delivery appointment scheduler 127 processes status codes received from carriers, normalized status codes or other information according to isSchedulable rules 148 to determine if delivery appointment scheduling delivery appointment scheduling is available for a shipment.

According to one embodiment, appointment_required and scheduling_available are set to Null or false for a shipment by default. An isRequired rule 146 for a carrier may directly map a carrier-specific status code or normalized status code for a shipment to appointment_required=true for the shipment. For example, an isRequired rule 146 for "APS" may map a status code "CALAGN" to appointment_required=true. In this example, if shipping management platform 110 receives a tracking event for a shipment with the status code of "CALGAN" from the carrier computer system 116 for "APS" (e.g., in an API response from the API 151), the delivery appointment scheduler 127 sets appointment_required=true for that shipment in the delivery_scheduling column 258.

In other cases, an isRequired rule 146 for a carrier can map multiple status codes to appointment_required=true. For example, an isRequired rule 146 for "Ace Carriers," may specify that appointment_required=true when 1) shipment product code for a shipment="B", "D", "D1", "E1", "E2", "P", "P1", "S1", "S2", "PL1", "PL2", "RC1", OR "RC2" AND 2) a "CON1" status code is received for the shipment. In this example, if shipping management platform 110 receives a tracking event for a shipment with the status code of "CON1" and receives a shipment product code "B" from the carrier computer system 116 for "Ace Carriers" (e.g., in an API response from the API 151), the delivery appointment scheduler 127 sets appointment_required=true for that shipment in the delivery_scheduling column 258.

Even if a shipment requires a delivery appointment, it may not be desirable to allow scheduling of a delivery appointment until a shipment has reached certain milestones, such as being received at the final terminal before delivery. Thus, a carrier computer system 116 may be configured to prevent appointment scheduling for a shipment until the milestone is reached.

Figure 3:
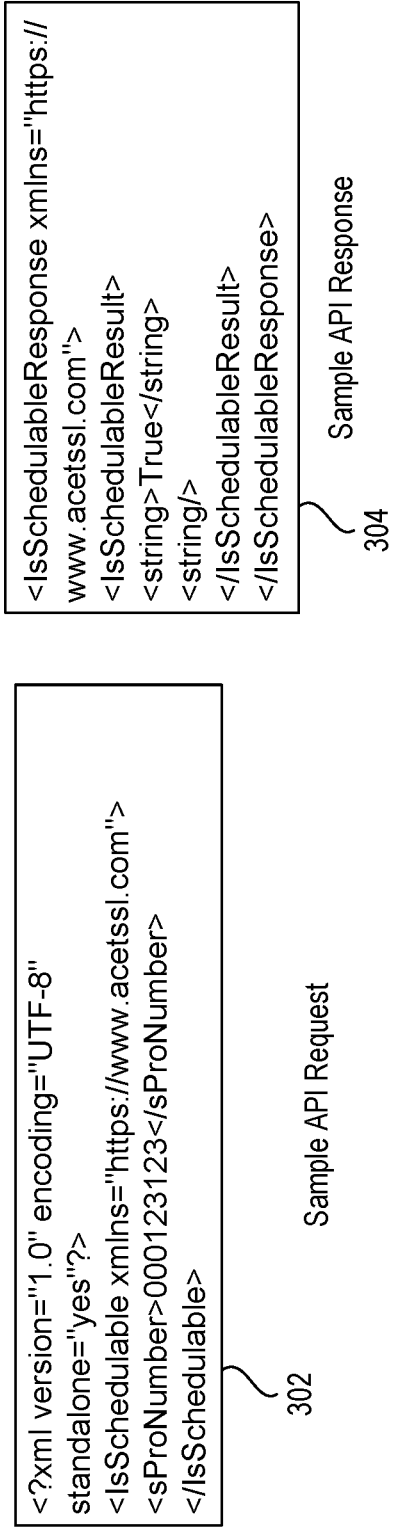
FIG. 3 is a diagrammatic representation of one embodiment of an API request and response.

In some cases, a carrier computer system 116 API 151 includes an endpoint that provides an indication of whether a delivery appointment is schedulable for a shipment. For example, a carrier system API 151, such as the carrier system API 151 for "Ace Carriers," may support an API call 302 and response 304 such as illustrated in FIG. 3. Using this example, delivery appointment scheduler 127 may periodically send API calls 302 to Ace Carrier's carrier computer system 116 for shipments associated with appointment_required=true and scheduling_available=false. On receiving response 304 for a shipment, delivery appointment scheduler 127 can update the scheduling_available field to scheduling_available=true for the shipment.

Thus, according to one embodiment, an isSchedulable rule 148 for carrier "Ace Carrier" can specify an API request for a carrier for requesting an indication of whether a delivery is schedulable. The delivery appointment scheduler 127 can periodically invoke the appropriate delivery appointment scheduling connector 124 to make the API request for the shipment to the delivery appointment scheduling API 151 of "Ace Carriers." On receiving response 304 for a shipment indicating that scheduling is available for the shipment, delivery appointment scheduler 127 updates the scheduling_available field to scheduling_available=true for the shipment.

In another embodiment, an isSchedulable rule 148 for a carrier specifies multiple data and conditions used to determine that scheduling is available. For instance, an isSchedulable rule 148 "APS" may specify that 1) if the status code "ALR" is returned by APS's API 151 for a shipment and the shipping record for the shipment includes the destination postal code, the shipping management platform 110 is to invoke APS's getAppointmentInfo API endpoint (e.g., which may be an endpoint of an API 151); 2) if the response from invoking the carrier's getAppointmentInfo API endpoint returns successfully, the shipping management platform 110 is to invoke the carrier's getSchedulerAppointments API endpoint (e.g., which may be an endpoint of an API 151); 3) if the response from invoking the carrier's getAppointmentInfo API endpoint returns at least one available time slot THEN scheduling_available=true for the shipment.

According to the previous example, once an ALR status code is received for a shipment that is associated with appointment_required=true and a destination postal code in data store 130, the delivery appointment scheduler 127 periodically invokes the appropriate delivery appointment scheduling connector 124 to invoke APS's getAppointmentInfo API endpoint for the shipment. When shipping management platform 110 receives a successful response to invoking the getAppointmentInfo API endpoint for the shipment, delivery appointment scheduler 127 periodically invokes the appropriate delivery appointment scheduling connector 124 to invoke the carrier's getAppointmentInfo API endpoint for the shipment. When the carrier's getAppointmentInfo API endpoint returns at least one available time slot for the shipment, delivery appointment scheduler 127 sets scheduling_available=true for the shipment.

Based on a determination that scheduling_available=true for a shipment, delivery appointment scheduler 127 generates a scheduling required notification (e.g., email notification, SMS notification or other notification that a delivery appointment is required) and sends the notification to the recipient. In one embodiment, delivery appointment scheduler 127 includes a link to a dynamically generated web page for the shipment in the notification, where the link includes an indication of the shipper, an indication of the carrier and an indication of the shipment. For instance, one example of a link format is:

https://tracking.getconvey.com/{shipper_brand}/{carrier_scac}?tn={tracking_number}

In this example, the link includes shipper name as the indication of the shipper, the carrier standard alpha code (SCAC) for the carrier as the indication of the carrier and the shipment tracking number as the indication of the shipment. Thus, when the recipient follows the link (e.g., clicks on the link or otherwise selects the link), the recipient's web browser will generate an HTTPS request that includes the indication of the shipment, the indication of the carrier and/or the indication of the shipper.

In some embodiments, delivery appointment scheduler 127 is configured to send the notification to the recipient via a preferred channel for the recipient. For SMS or text notifications, delivery appointment scheduler 127 can maintain a template into which delivery appointment scheduler 127 inserts various pieces of data about the shipment and the link. For emails, delivery appointment scheduler 127 can maintain email templates into which delivery appointment scheduler 127 inserts various pieces of information about the shipment, digital assets 134 of the shipper associated with the shipment and the link.

Figure 4:
FIG. 4 is a diagrammatic representation of one embodiment of a notification with respect to a shipment.

FIG. 4 illustrates one embodiment of a delivery appointment scheduling required SMS notification 400 notifying a recipient that delivery appoint is required with APS for a shipment from hypothetical retailer "Furniture Place." In this example, delivery appointment scheduler 127 is configured to send a notification of the form: "A delivery appointment is required with <carrier_name> for your <shipper_name> shipment now: <link>".

Figure 5:
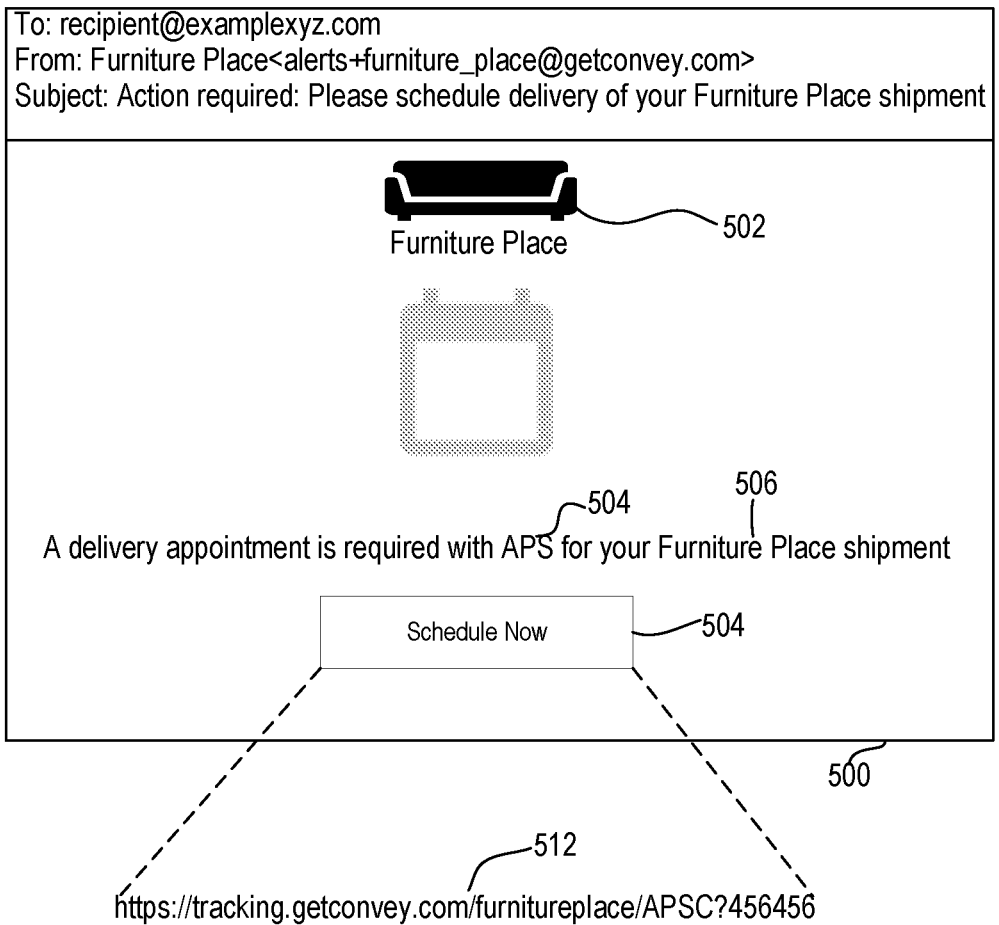
FIG. 5 is a diagrammatic representation of another embodiment of a notification with respect to a shipment.

FIG. 5 illustrates one embodiment of a delivery appointment required email notification 500. In this example, delivery appointment scheduler 127 is configured to populate an email template with a digital asset 502 that visually corresponds to the shipper (e.g., the shipper logo) and template language with the carrier name 504 and shipper name 506. Delivery appointment scheduler further populates the link information for "Schedule Now" button 510 with the appropriate link 512 for the shipment.

Thus, the intended recipient of a shipment (e.g., a consumer) receives a notification that appointment scheduling is required and available for a shipment expected from the shipper (e.g., retailer).

Responsive to an indication that the user (e.g., intended recipient) wishes to schedule a delivery appointment for a shipment—for instance, based on receiving a request for a page: tracking.getconvey.com/{shipper_brand}/{carrier_scac}?tn={tracking_number}—delivery appointment scheduler 127 connects to the carrier computer system 116 for the carrier using the appropriate delivery appointment scheduling connector 124 and requests available time slots for the shipment. Delivery appointment scheduler 127 applies time slot mapping rules 149 to map the carrier specific time slot format for available time slots into page code for a time slot selector tool. In some embodiments, this may include mapping times to the local time zone of the recipient based, for example, on destination zip code.

Clicking on the link directs the recipient to a dynamically generated tracking page for the shipment, where the tracking pages includes (directly by a reference in the page) a time slot selection tool. The tracking page can be based on a generic template or a shipper-specific template and include references that resolve to digital assets 134 associated with the shipper and controls related to delivery appointment scheduling.

Figure 6A:
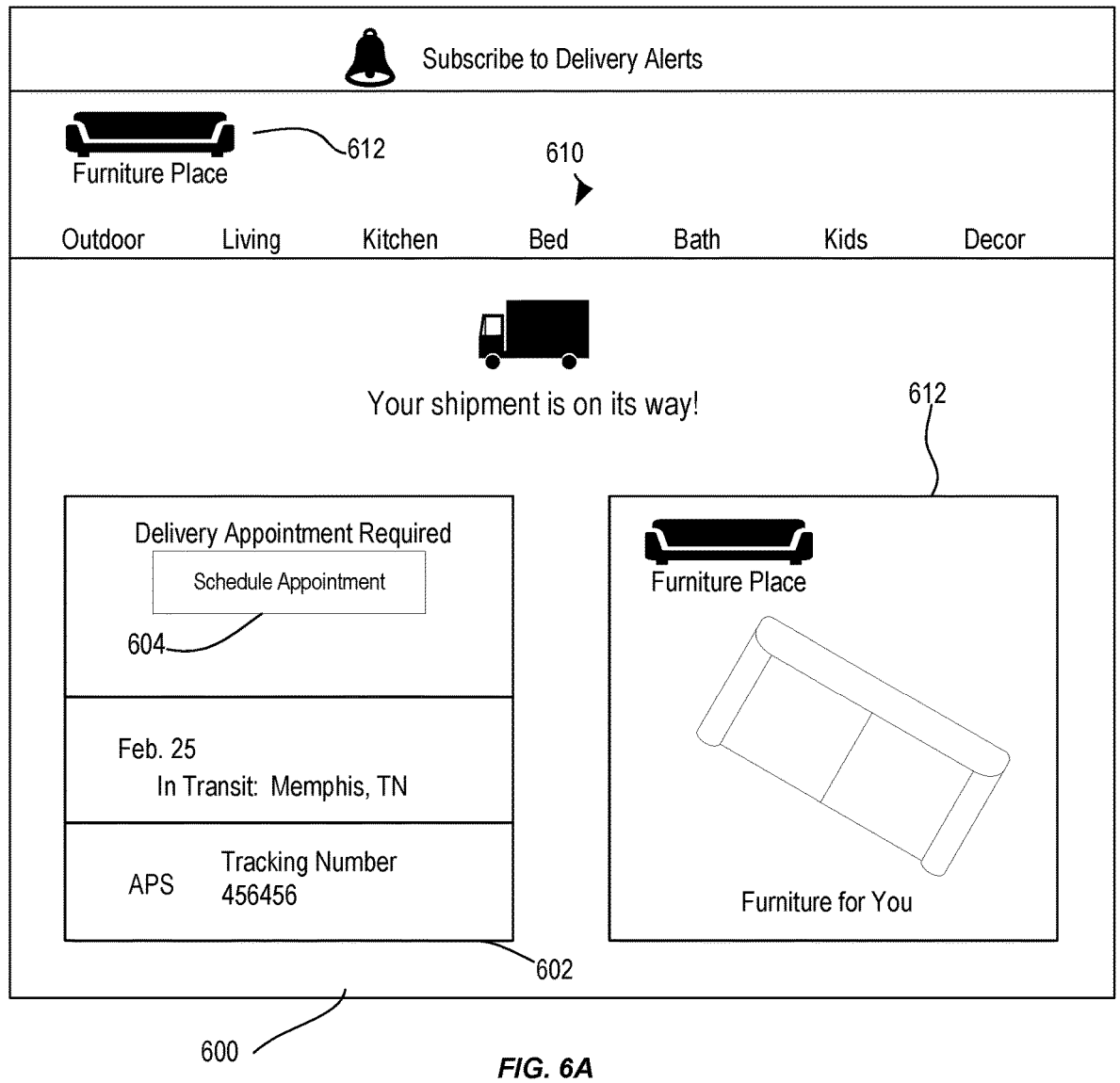
FIG. 6A is diagrammatic representation of one embodiment of a tracking page.

FIG. 6A illustrates one embodiment of a tracking page 600 for a shipment. In the illustrated embodiment, tracking page 600 includes a tracking widget 602 with various pieces of information about the shipment and a "Schedule Appointment" button 604 visible. Tracking page 600 can include various digital assets 134 of the shipper so that tracking page 600 has the look and feel of a page provided directly by the shipper. For example, tracking page 600 includes links 610 and branding 612 and is stylistically similar (e.g., layout, color, etc.) to pages provided by hypothetical retailer "Furniture Place."

Figure 6B:
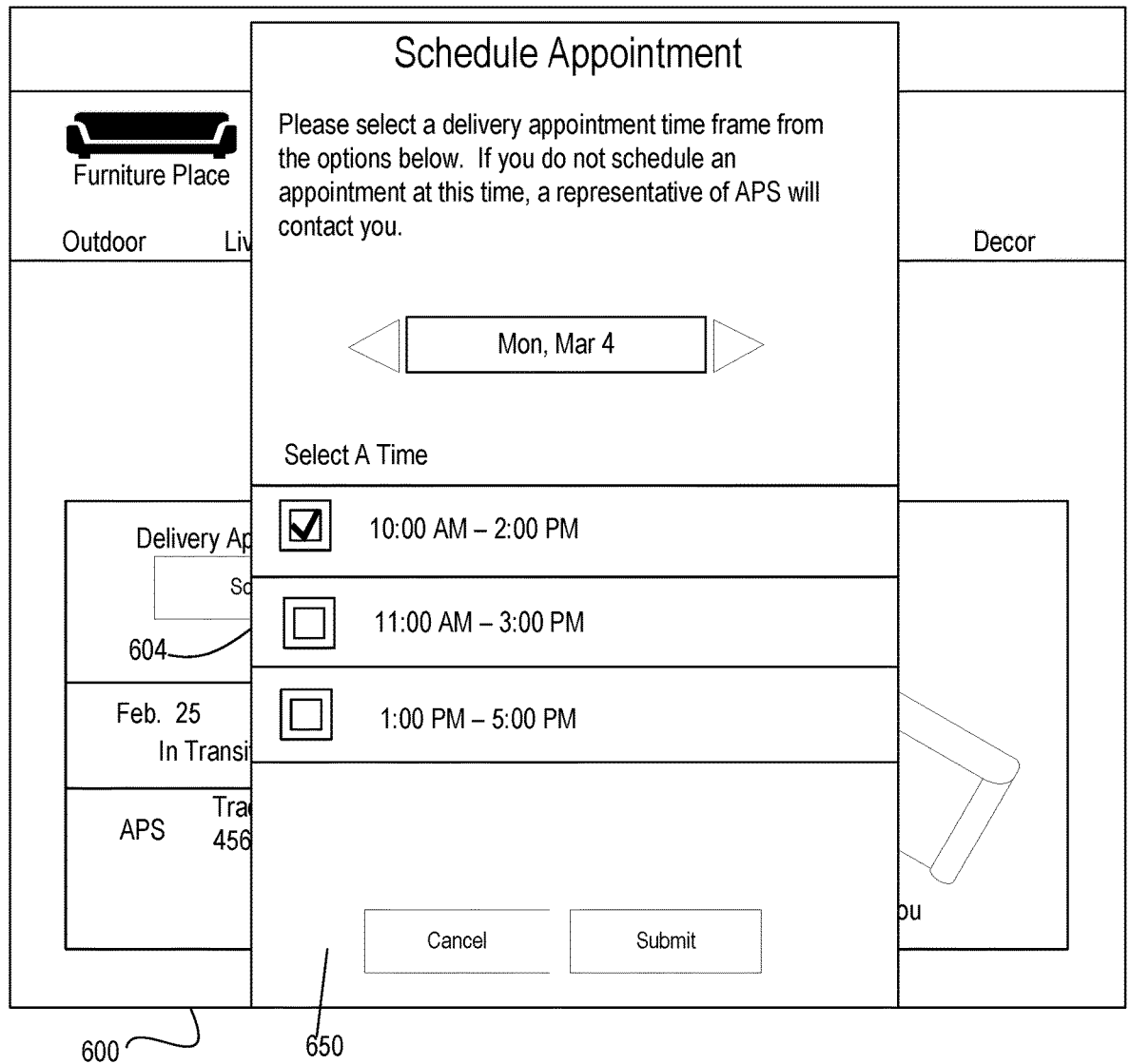
FIG. 6B is a diagrammatic representation of a time slot selection tool.

In the illustrated example, clicking on the "Schedule Appointment" button 604 opens the time slot selector tool 650, one embodiment of which is illustrated in FIG. 6B. Time slot selector tool 650 provides controls to allow the intended recipient to select an available time slot for delivery. As indicated, an available time slot may be a combination of a date and time range on that date.

Responsive to receiving a user (recipient) selection of a time slot, delivery appointment scheduler 127 provides the selected time slot to the carrier computer system 116 via the appropriate delivery appointment scheduling connector 124. If the carrier system API 151 responds with an indication that the delivery appointment was scheduled successfully, delivery appointment scheduler stores the appointment information in the appropriate delivery appointment scheduling record 142 (e.g., in delivery_appointment column 260).

Figure 6C:
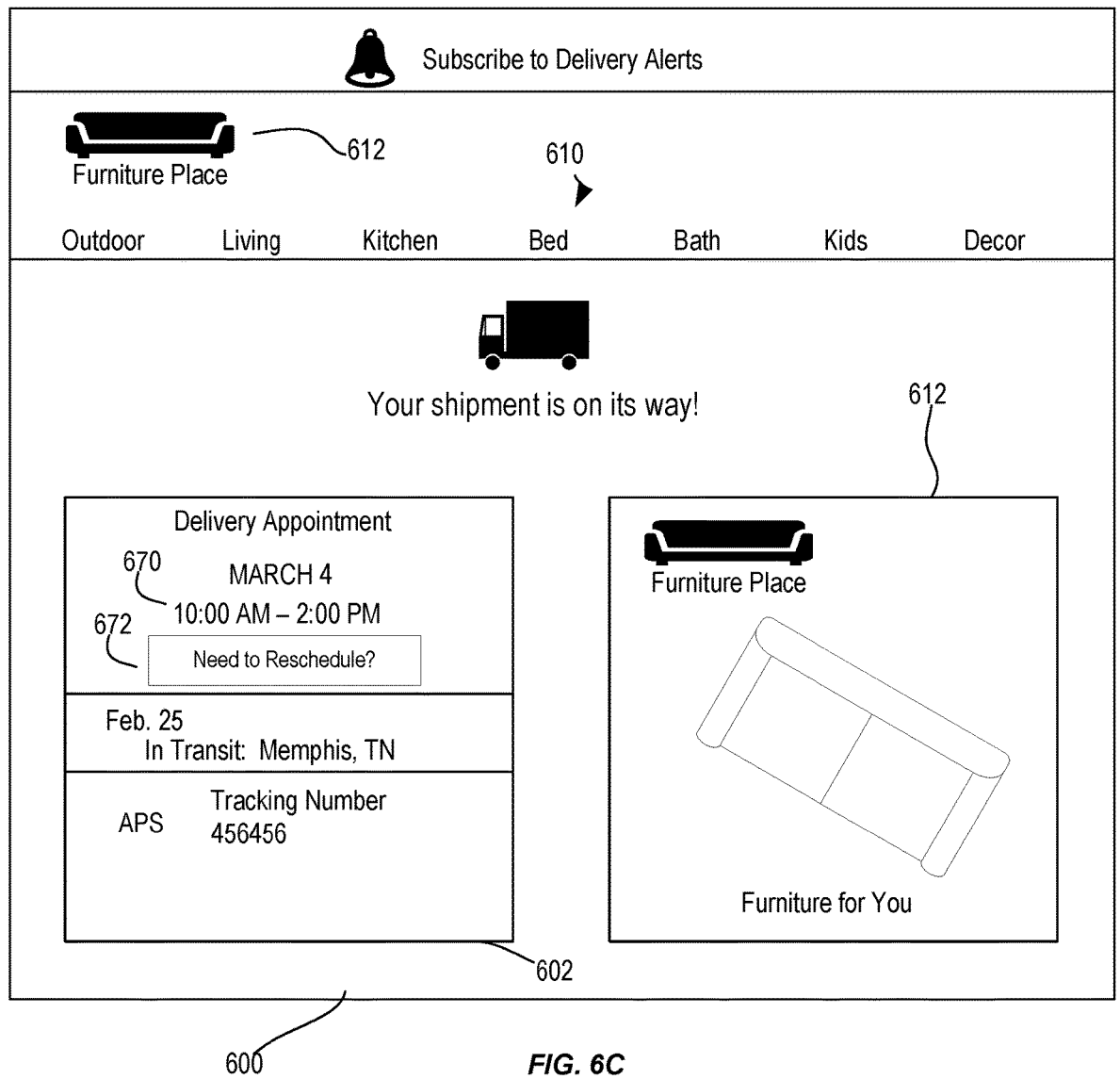
FIG. 6C is a diagrammatic representation of one embodiment of an updated tracking page.

Once shipping management platform 110 receives a successful response back from the carrier API 151 for a delivery appointment, shipping management platform 110 can update the tracking page or other page to show the scheduled time slot. FIG. 6C, for example, illustrates page 600 with tracking widget 602 updated with the scheduled delivery appointment information 670. If the carrier computer system 116 does not support rescheduling through API 151 or other computer interface, page 600 may simply include a message to call the carrier if rescheduling is required. If the carrier allows rescheduling, the page may also include a control for rescheduling. For example, in FIG. 6C, widget 602 includes button 672 that opens a time slot selector tool configured with currently open delivery appointment time slots. According to one embodiment, the capability to reschedule is visible until the delivery appointment has occurred, and the item has been delivered (or based on carrier-specific logic that determines the point at which rescheduling cannot occur).

Figure 6D:
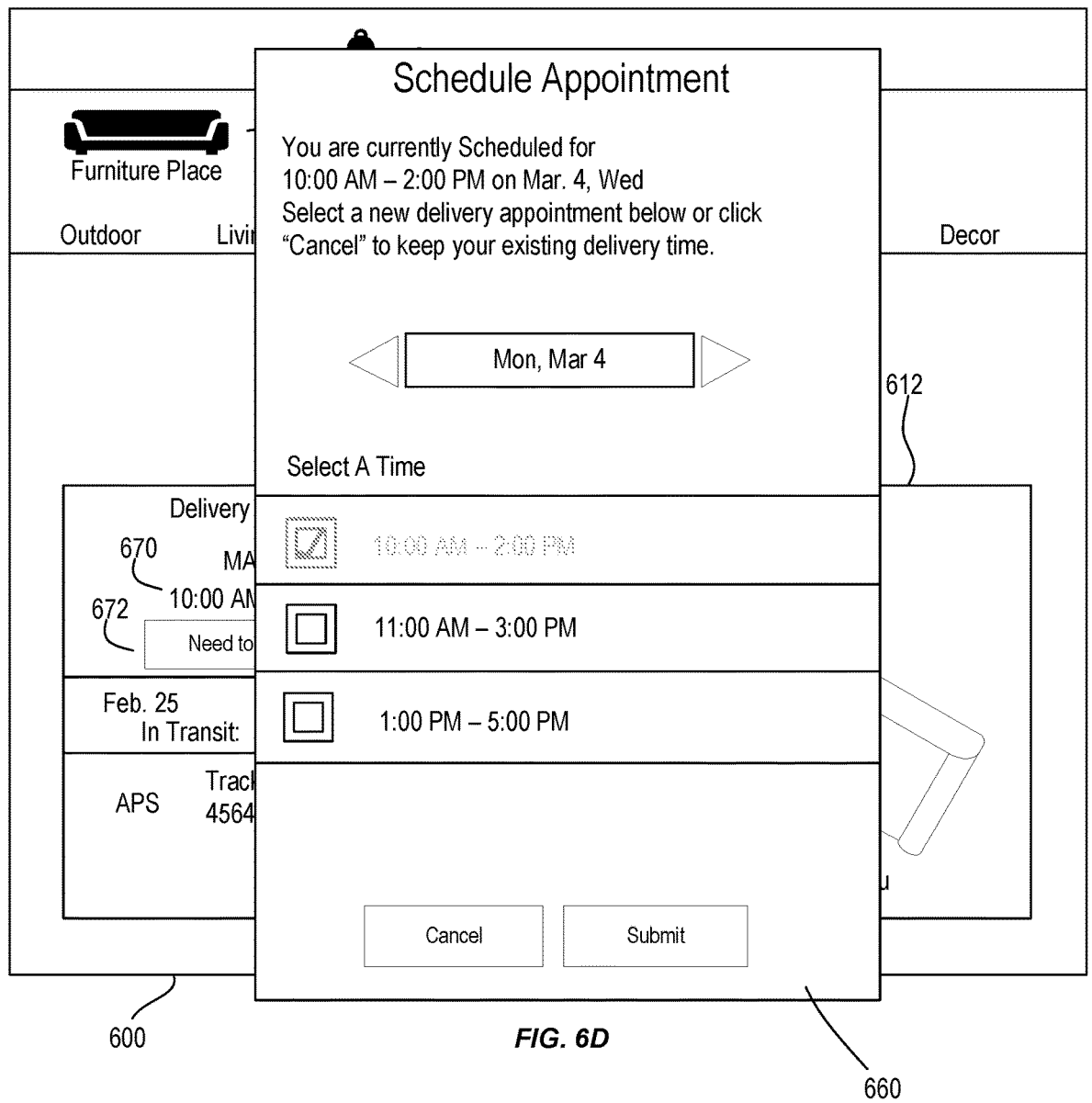
FIG. 6D is a diagrammatic representation of one embodiment of a time slot selection tool for rescheduling a delivery.

Thus, if the intended recipient needs to reschedule the delivery appointment, the intended recipient can return to tracking page 600 and click on button 672 to open a timeslot selector tool for rescheduling. FIG. 6D, for example, illustrates one embodiment of a time slot selector tool 680 for rescheduling a delivery. In the illustrated embodiment, the tool includes language that identifies that the recipient has previously scheduled an appointment and the existing appointment selection. While the same available time slots are shown in FIG. 6D as in FIG. 6B, this may not always be the case. In some embodiments, clicking button 672 causes delivery appointment scheduler 127 to request available time skits from the carrier via the carrier API 151 such that time slot selector tool 680 includes different time slots than were previously presented to the recipient (unless coincidently the same time slots are available).

Choosing a different appointment date and time will result in delivery appointment scheduler 127 providing the selected time slot to the carrier computer system 116 via the appropriate delivery appointment scheduling connector 124. If the carrier system API 151 responds with an indication that the delivery appointment was scheduled successfully, delivery appointment scheduler 127 stores the appointment information in the appropriate delivery appointment scheduling record 142 (e.g., in delivery_appointment column 260). If the user selects "Cancel" in time slot selector tool 680, the existing delivery appointment will be retained.

Further, delivery appointment scheduler 127 can send delivery appointment confirmation notifications by various channels that a delivery appointment was successfully scheduled (including rescheduled). Such notifications can be sent by text message, email or other channel. FIG. 7 illustrates one embodiment of a SMS delivery appointment confirmation notification 700 that includes the date and time of the delivery appointment and a link to the dynamically generated tracking page (e.g., page 600) for the shipment. In this example, delivery appointment scheduler 127 is configured to send a notification of the form: "Reminder: You have scheduled a delivery appointment for your Furniture Place shipment for your <shipper_name> shipment with <carrier_name> on <appointment_date>,<appointment_begin_time>. View details: <link>". It can be noted that delivery appointment scheduler 127 can be configured to convert the <appointment_date>, <appointment_begin_time> indicated in the delivery appointment scheduling record 142 for the shipment to a preferred format and time zone (e.g., the recipient's time zone).

FIG. 8 illustrates one embodiment of a delivery appointment confirmation email 800. In this example, delivery appointment scheduler 127 is configured to populate an email template with digitals assets 134 of a shipper (e.g., the shipper logo) and template language with the carrier name, shipper name, appointment date and time populated. Delivery appointment scheduler 127 may also attach a calendar invite 802 so that the recipient can add the appointment to his or her digital calendaring software. Again, delivery appointment scheduler 127 can be configured to convert the <appointment_date>, <appointment_begin_time> indicated in the delivery appointment scheduling record 142 for the shipment to a preferred format and time zone (e.g., the recipient's time zone). Delivery appointment scheduler 127 further populates the link information for "View Details" button 810 with the appropriate link for the shipment.

Figure 9:
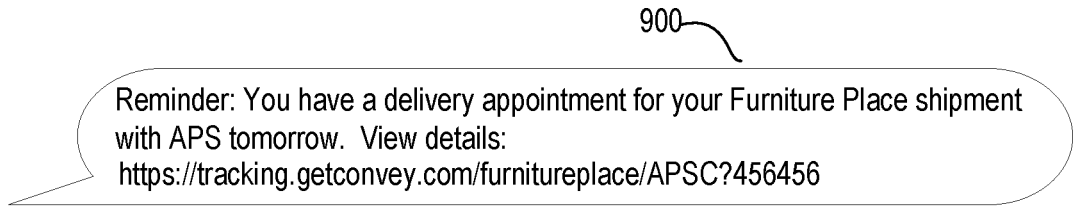
FIG. 9 is a diagrammatic representation of another embodiment of a notification with respect to a shipment.
Figure 10:
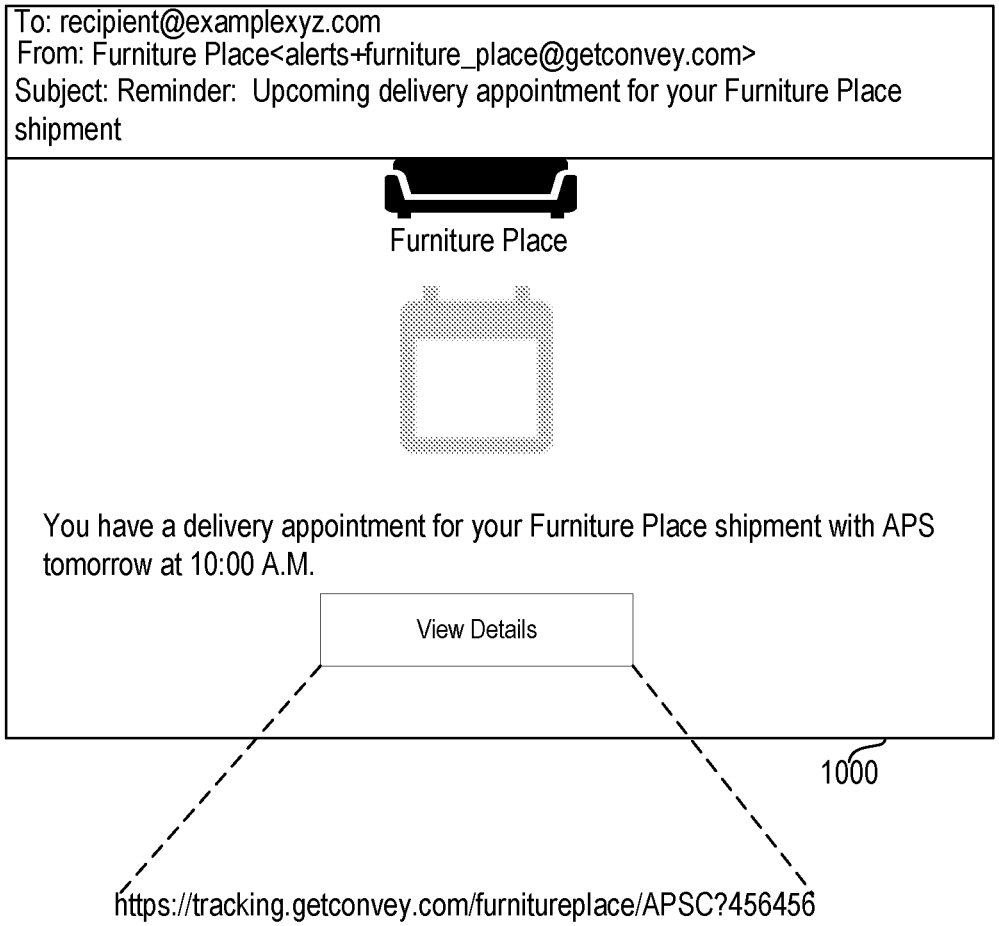
FIG. 10 is a diagrammatic representation of another embodiment of a notification with respect to a shipment.

Delivery appointment scheduler 127 can further send additional reminders. In one embodiment, for example, delivery appointment scheduler 127 can be configured to send a reminder 24 hours ahead of when the delivery appointment is booked. FIG. 9 illustrates one example of a reminder SMS 900 and FIG. 10 illustrates one embodiment of a reminder email 1000.

If the carrier computer system 116 API 151 responds with an indication that scheduling of the delivery appointment was not scheduled successfully, delivery appointment scheduler 127 can take various actions. According to one embodiment, delivery appointment scheduler 127 generates an error page and returns the error page to the user. According to another embodiment, delivery appointment scheduler 127 requests available time slots from the carrier again and, if there are time slots available, updates the time slot selector tool presented to the user.

It can be noted that in some embodiments, available time slots from a carrier are not persisted at shipping management platform 110 but are held only in volatile memory until a delivery appointment is successfully booked with the carrier system. For example, time slot is persisted to a delivery appointment scheduling record 142 for the shipment (e.g., in column 260) when shipping management platform 110 receives an indication that a delivery appointment has been successfully scheduled for that time slot.

In some cases, a carrier API 151 or shipment report file may indicate that a delivery appointment has been scheduled for a shipment. If the delivery appointment information in a tracking event differs from that in a delivery appointment scheduling record 142 for the shipment, shipping management platform 110 can update the delivery appointment scheduling record 142 with the appointment information received from the carrier. Shipping management platform 110 can further track if a particular delivery appointment was booked through platform 110 or received from the carrier computer system 116.

Figure 11:
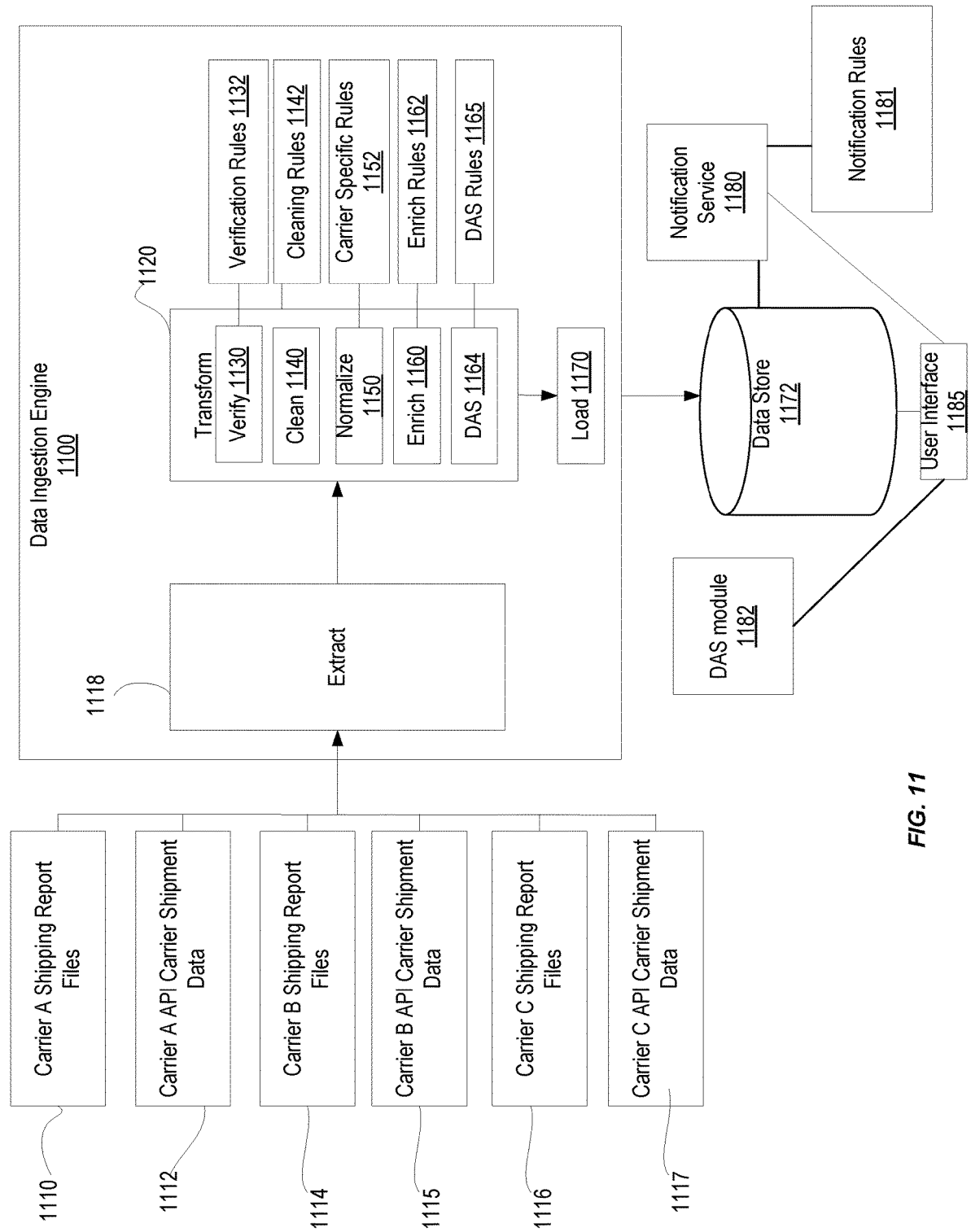
FIG. 11 is a functional block diagram of one embodiment of a shipping management platform.

FIG. 11 is a functional block diagram depicting one example of a shipping management platform. For clarity, FIG. 11 does not show other components of the shipping management platform, for example some of the components depicted in FIG. 1. It can be noted that shipping management platform 110 may request shipment information on behalf of an account holder (e.g., shipper), using the credentials for that account holder to retrieve information from a carrier system. Thus, shipping management platform may receive information on shipments for that account holder regardless of whether the shipments were executed through the shipping management platform.

FIG. 11 shows that data ingestion engine 1100 receives shipment information from a plurality of carriers according to a plurality of integration paths. Thus, ingestion engine 1100 may receive Carrier A shipment report files 1110, Carrier B shipment report files 1114 and Carrier C shipment report files 1116 and Carrier A API shipment data 1112, Carrier B API shipment data 1115, Carrier C API shipment data 1117. API shipment data 1112, API shipment data 1115 and API shipment data 1117 may include tracking data and delivery appointment scheduling data.

At extract step 1118, ingestion engine 1100 extracts carrier shipment records from received shipping record files or API shipment data. According to one embodiment, each shipment report file 1110, 1114, 1116 provided by a carrier contains shipment information for a particular shipper (or other account holder) and is formatted according to a defined format, which may be carrier specific. Ingestion engine 1100 can be configured to extract carrier shipment records for a shipper from the shipment report files. In some cases, the carrier shipment record from a shipment report file is simply unique shipment identifier (such as a tracking number or other unique, carrier-assigned shipment identifier) to indicate the existence of a particular shipment. In other cases, a shipment record may include status information.

Further, data 1112, 1115, 1117 returned based on API calls may include, shipment information formatted according to the respective public API. Ingestion engine 1100 can be configured to extract carrier shipment records from the data returned via the APIs. In some embodiments, ingestion engine 1100 may be configured to extract shipment identifiers from shipment report files and make API calls to collect additional information about the identified shipments.

Ingestion engine 1100 may further implement a transform step 1120, that may include several processes. For example, in the illustrated embodiment, transform step 1120 includes verify step 1130, clean step 1140, normalize step 1150 and enrich step 1160. At the verify step 1130 step, ingestion engine 1100 applies verification rules 1132 to verify the accuracy or validity of the data. The verification rules may depend on carrier, shipper or other parameters. For example, for a particular shipper, the verification rules may specify that an order number has to have a known number of characters, or start or end with a known sequence of characters. If the data, does not match the expected data pattern, ingestion engine 1100 can make a determination of whether to discard or ignore the data. Such rules may be specific to certain carriers and/or certain account holders (e.g., shippers). If the verification step identifies an issue, ingestion engine 1100 may also attempt to correct errors, or search for data from another data source.

At clean step 1140, ingestion engine 1100 applies data cleaning 1142 rules to clean the input data carrier shipment records or to make data fields consistent. Examples of cleaning steps may include deleting leading or trailing spaces in a data field, standardizing zip code or state field formats.

At normalize step 1150, ingestion engine 1100 accesses carrier-specific rules 1152, which may include, for example, carrier-specific status mappings 150, to map descriptions and exception flags to normalized status codes, descriptions and exception flags. Data from a plurality of carriers or data sources is normalized, resulting in data that has common status codes across multiple carriers and other data sources. Another aspect of data normalization relates to information received that is not in the form of a status code. For example, some carriers may generate status or tracking information in the form of messages that may not be even internally standardized, for example, in the form of free-form text, text chosen from a list, etc. Ingestion engine 1100 can be configured to analyze free-form text or similar messages and attempt to determine a normalized status. In one example, ingestion engine 1100 uses word matching algorithms to match words in a message with key words that may indicate a particular status. In another example, machine learning or trained computers can be used to analyze and interpret the text in messages.

For a carrier shipment record associated with a shipper (or other account holder), ingestion engine 1100 can traverse a rules document to determine the rules applicable to the carrier. In applying a rule, ingestion engine 1100 determines if an input status code and/or status description matches a condition based on the specified matching rule (e.g., "matches exactly", "starts with", "ends with" or regular-expression based matching rule, that is applied to the input status code or status description). In some embodiments, applying matching rules may include parsing carrier provided transit data for specific codes or descriptive words (e.g., "arrived"). If the status pattern or status description pattern matches the condition according to the matching rule, then the normalized shipment status and exception flag, if appropriate, are set for the shipment, thus generating normalized shipping information.

The enrich or enhance step 1160 can be used to enrich or enhance data according to enrich rules 1162. In some examples, properties can be implied based on the data. For example, package tracking data typically includes a timestamp. The timestamp may or may not be universal, so viewing the timestamp, without knowing the context, may present a problem. In the context of tracking data, for example, the shipping management platform can see from the data the time zone in which a status event occurred. The timestamp can then be enhanced to include the actual time zone, or the enrich step can convert the timestamp to a local or universal time, as desired. This can help prevent tracking data from being listed out of order, due to differing time zones.

In another example of data enrichment, if the origin or destination location (e.g., postal code) is missing, but that information is available on either the first tracking event (e.g., pickup) or the last tracking event (e.g., delivery), for example, then the shipment record location information can be inferred.

In another example of data enrichment, if a shipment has been executed on the shipping management platform, when the shipping management platform collects the original shipment weight and cost, those values can be stored onto the shipment record as original weight and original cost. As the same shipment is being ingested and processed into the shipping management platform the system will detect changes of weight and cost compared to the original shipment record then the system can persist those as actual weight and cost and can notify users changes (or create alerts).

In another example of data enrichment, when ingesting a large number of shipments, which could be assigned to the wrong carrier in the data feed, the system can run a number of rules over the provided tracking number to verify whether its format or pattern is compatible with the provided carrier. If it is not, the system can attempt to correct the carrier by gathering carriers which match the format or pattern of the provided tracking number, and use rules to pick a winner if it can be safely done (e.g., only a single carrier is returned as a candidate).

At delivery appointment scheduling step 1164, ingestion engine 1100 accesses carrier-specific DAS rules 1165, which may include, for example, isRequired rules 146 and isSchedulable rules 148, to map descriptions or status codes to appointment_required=true and scheduling_available=true. In some cases, ingestion engine 1100 may access existing data in data store 1172 for the shipment when applying an isRequired rule 146 or isSchedulable rule 148 to the shipment.

Once the extracted data is transformed, ingestion engine 1100 determines if the transformed data corresponds to an existing shipping record. To determine if the data refers to a new or existing shipping record, the shipping management platform can look to fields such as a carrier SCAC, a carrier's unique tacking number, or other fields, for example. The shipping management platform may also determine if an event for a shipment is duplicative of an event in an event record. For example, shipping management platform can compare the normalized event code, time stamp and other fields to event records for a shipment to determine if the event record is duplicative.

The new transformed data is then loaded (step 1170) into the data store 1172, which may be one example of data store 130. If the data does not correspond to an existing shipping record, ingestion engine 1100 creates a new shipping record and/or scheduling record for the data. If the data corresponds to an existing shipping record and is not duplicative, the shipping management platform appends or updates an existing shipping record with the new data. Updating a shipping record may include updating the event records or scheduling records associated with the shipping record.

As shipment data is extracted, transformed, and stored, a search index is updated to reflect the new or updated data. In some embodiments, the search index is updated in real-time, or close to real-time, as new events, shipments, etc. are entered into the system.

FIG. 11 also shows a notification module 1180. Notification module can scan or query shipping records and apply notification rules 1181 to the scheduling records to send delivery appointment scheduling related notifications. For example, notification module 1180 can scan or query data store 1172 for shipments for which scheduling_available=true and a scheduling required notification has not been sent, and can generate a scheduling required notifications (e.g., SMS notification 400, email notification 500, etc.). As another example, notification module 1180 can scan or query data store 1172 for shipments for which delivery_appointment is populated, but for which a delivery appointment confirmation has not been sent and generate the delivery appointment confirmation (e.g., SMS notification 700, email notification 800). As yet another example, notification module 1180 can scan or query data store 1172 for shipments for which appointment_date and appointment_begin_time are within the next 24 hours and for which a delivery appointment reminder has not been sent and generate a delivery appointment reminder (e.g., SMS 900, email 1000).

According to one embodiment, shipping management platform 110 may receive a request from a client computer (e.g., a recipient computer system 114) for an interface containing data associated with a shipment and substantially simultaneously initiate generation of a responsive user interface (UI) 1185. In one example, the UI 1185 is a web-based user interface comprising one or more web pages.

Responsive to a shipment-specific request, shipping management platform 110 can access the records for the shipment and determine if the shipment is associated with scheduling_available=true. If so, a delivery appointment scheduling module 1182 connects to the appropriate carrier system, requests the available timeslots delivery timeslots and provides the available time slots to the UI generation code, in some cases, applying time slot mapping rules (e.g., time slot mapping rules 149). Consequently, UI 1185 can comprise a time slot selector tool to allow the user to select an available delivery time slot for the shipment. One embodiment of a UI 1185 is illustrated in FIG. 6A-6C. UI 1185 may also include one or more web pages that include shipment tracking data for the shipment.

Based on the selection of a time slot, delivery appointment scheduling module 1182 propagates the selection to the carrier system and updates the scheduling record for the shipment (e.g., populates delivery_appointment for the shipment).

It can be noted that, in some embodiments, the shipping management platform may have to repeatedly query a carrier system's API 151 to determine if scheduling_available=true for a shipment. In some embodiments, the shipping management platform 110 only queries the carrier system APIs with respect to delivery appointment scheduling information for shipments having appointment_required=true. Moreover, API calls by a carrier service for delivery appointment scheduling information can be scheduled similar to the manner in which API calls for tracking events are scheduled as described in United States Patent Publication 2019/0213538.

Figure 12A:
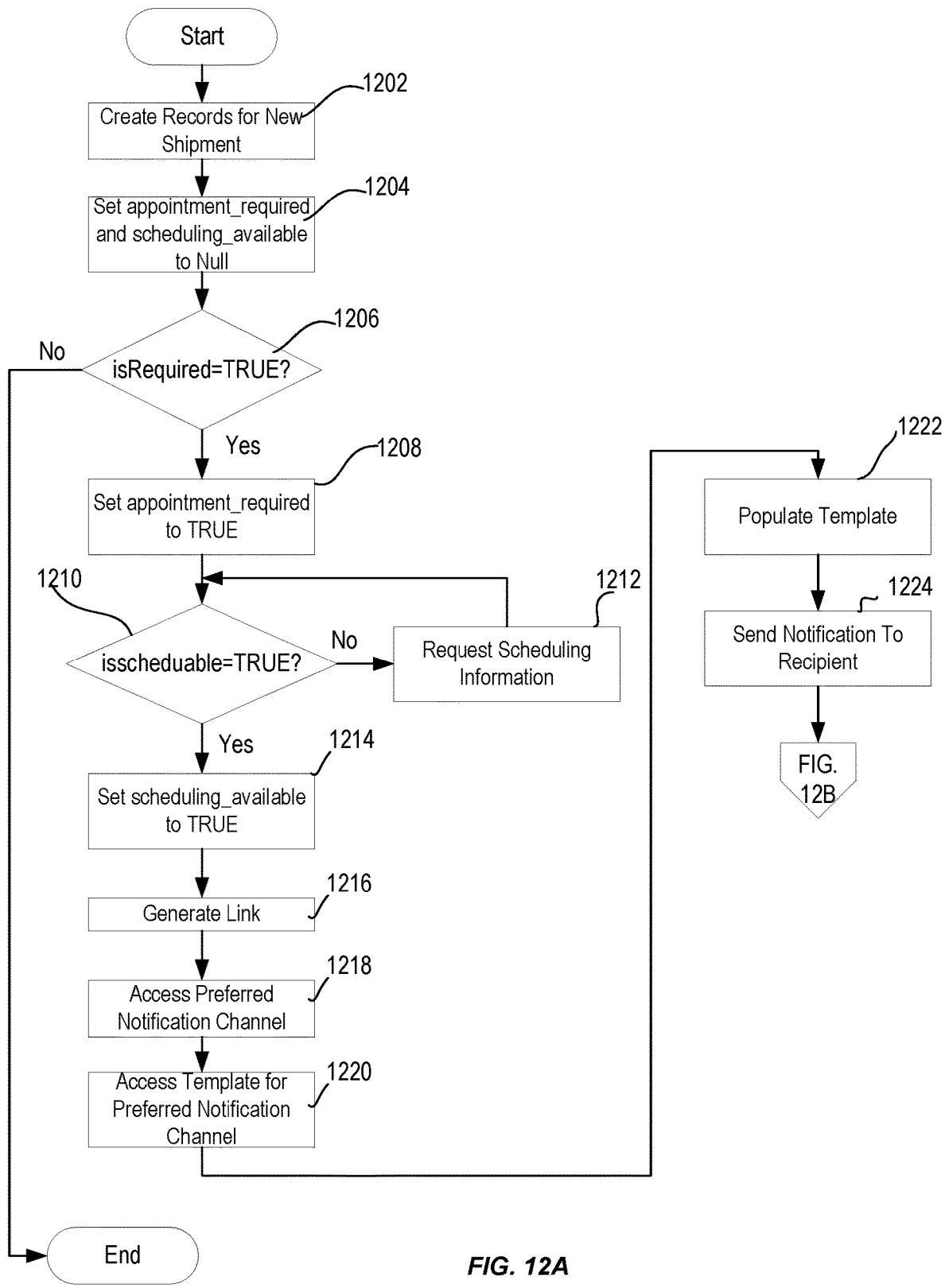
FIG. 12A and FIG. 12B are a flow chart illustrating one embodiment of method for facilitating appointment scheduling with an outsourced carrier system.
Figure 12B:
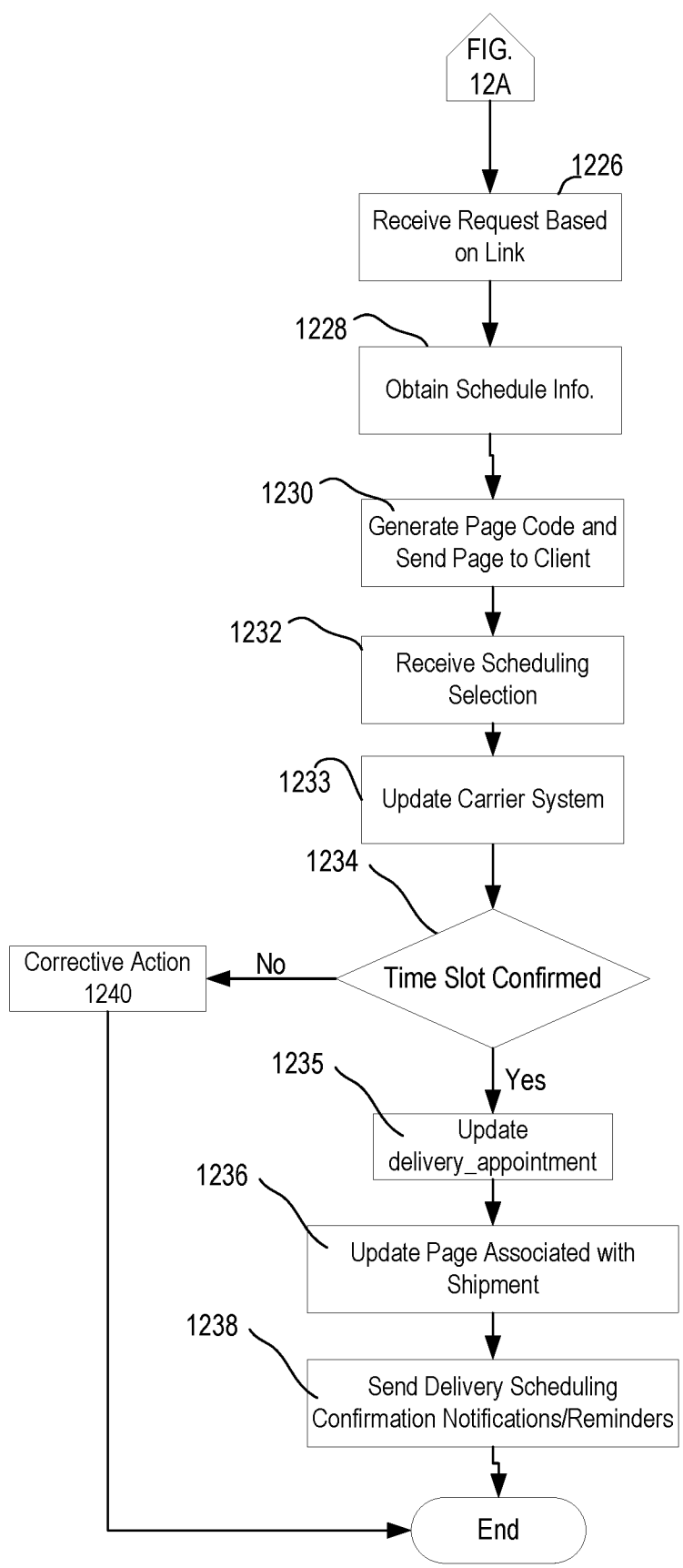

FIG. 12A and FIG. 12B are a flow chart illustrating one embodiment of method for an intermediated shipping logistics system to facilitate appointment scheduling with outsourced carrier system. In some embodiments, the steps may be embodied as computer code on a non-transitory computer readable medium.

When processing shipment-specific information for a shipper, a shipping management platform or other shipping management system can identify if the shipment is a new shipment (a shipment for which there is no shipping record) or an existing shipment. If the shipment is a new a shipment, the shipping management platform can create database records for the shipment, such as a shipping record, an initial event record and an associated delivery appointment scheduling record for the shipment (step 1202). According to one embodiment, the appointment_required and scheduling_available attributes can be set to Null by default for the shipment (step 1204).

The shipping management platform processes status codes received from carriers, normalized status codes or other information according to isRequired rules to determine if a delivery appointment is required for a shipment (step 1206). If scheduling a delivery appoint is required, the shipping management platform sets appointment_required=true for the shipment (step 1208). As discussed above, an isRequired rule for a carrier may directly map a carrier-specific status code or normalized status code for a shipment to appointment_required=true. In other cases, an isRequired rule for a carrier can map multiple status codes to appointment_required=true. If scheduling a delivery appointment is not required, the method can end, and the shipment can be processed without scheduling a delivery appointment.

For shipments for which a delivery appointment is required, the shipping management platform processes status codes received from carriers, normalized status codes or other information according to isSchedulable rules to determine if delivery appointment scheduling delivery appointment scheduling is available for a shipment (step 1210). If scheduling is not yet available, the shipping management platform continues to check for an indication that scheduling is available for the shipment (step 1212). When the shipping management platform determines that scheduling is available for the shipment, the shipping management platform set scheduling_available=true for the shipment (step 1214).

As discussed above, an isSchedulable rule for a carrier may specify an API request for a carrier for requesting an indication of whether a delivery is schedulable. The shipping management platform can periodically invoke the appropriate delivery appointment scheduling connector to make the API request for the shipment to the delivery appointment scheduling API of the respective carrier. On receiving a response for a shipment indicating that scheduling is available, the shipping management platform updates the scheduling_available field to scheduling_available=true for the shipment. In another embodiment, an isSchedulable rule for a carrier specifies multiple data and conditions used to determine that scheduling is available.

Based on a determination that scheduling_available=true for a shipment, the shipping management platform generates a link for a dynamically generated web page for the shipment (step 1216). According to one embodiment, the link contains an indication of the shipment. The link may also contain an indication of the shipper or the carrier. The shipping management platform further determines the preferred notification channel associated with the shipment (step 1218) and accesses a template for the preferred notification channel (step 1220). In some cases, the template for a preferred notification channel may be carrier or shipper specific. In any case, the shipping management platform populates the template with information from the records associated with the shipment (step 1222) and, depending on the template, digital assets of the shipper and sends the notification to the recipient (step 1224).

When the recipient follows the link (e.g., clicks on the link or otherwise selects the link), the recipient's web browser will generate an HTTPS request that includes the indication of the shipment, the indication of the carrier and/or the indication of the shipper.

Responsive to an indication that the user (e.g., intended recipient) wishes to schedule a delivery appointment for a shipment—for instance, based on receiving a request based on the link (step 1226)—the shipping management platform obtains scheduling information for the shipment (step 1228). For example, the shipping management platform connects to the carrier computer system for the carrier with which the shipment is associated and requests available time slots for the shipment. The shipping management system may apply time slot mapping rules to map the carrier specific time slot format for available time slots into page code for a time slot selector tool. In some embodiments, this may include mapping times to the local time zone of the recipient based, for example, on destination zip code.

The shipping management platform generates page code responsive to the request and returns the page code to the client (step 1230). Thus, clicking on the link directs the recipient to a dynamically generated web page for the shipment, where the web page includes a time slot selection tool. The tracking page can be based on a generic template or a shipper-specific template and include references that resolve to digital assets associated with the shipper and controls related to delivery appointment scheduling.

Responsive to receiving a user (recipient) selection of a time slot, the shipping management platform provides the selected time slot to the carrier computer system of the carrier associated with the shipment via the appropriate delivery appointment scheduling connector (step 1233). If the carrier system responds with an indication that the delivery appointment was scheduled successfully (as determined at step 1234), the shipping management platform stores the appointment information in the appropriate delivery appointment scheduling record (e.g., in delivery_appointment) (step 1235).

Once shipping management platform 110 receives a successful response back from the carrier system for a delivery appointment, the shipping management platform can update the tracking page to show the scheduled time slot (step 1236).

Further, the shipping management platform can send delivery appointment confirmation notifications by various channels that a delivery appointment was successfully scheduled (step 1238). Such notifications can be sent by text message, email or other channel. The shipping management platform can further send additional reminders. In one embodiment, for example, the shipping management platform can be configured to send a reminder 24 hours ahead of when the delivery appointment is booked.

If the carrier computer system responds with an indication that scheduling of the delivery appointment was not scheduled successfully, the shipping management platform can take various corrective actions (step 1240). According to one embodiment, shipping management platform generates an error page and returns the error page to the user. According to another embodiment, shipping management platform requests available time slots from the carrier again and, if there are time slots available, updates the time slot selector tool presented to the user.

FIG. 12A and FIG. 12B are provided by way of example and not limitation. Various steps may be repeated, steps may be performed in different orders, steps omitted, and additional or alternative steps performed.

Figure 13:
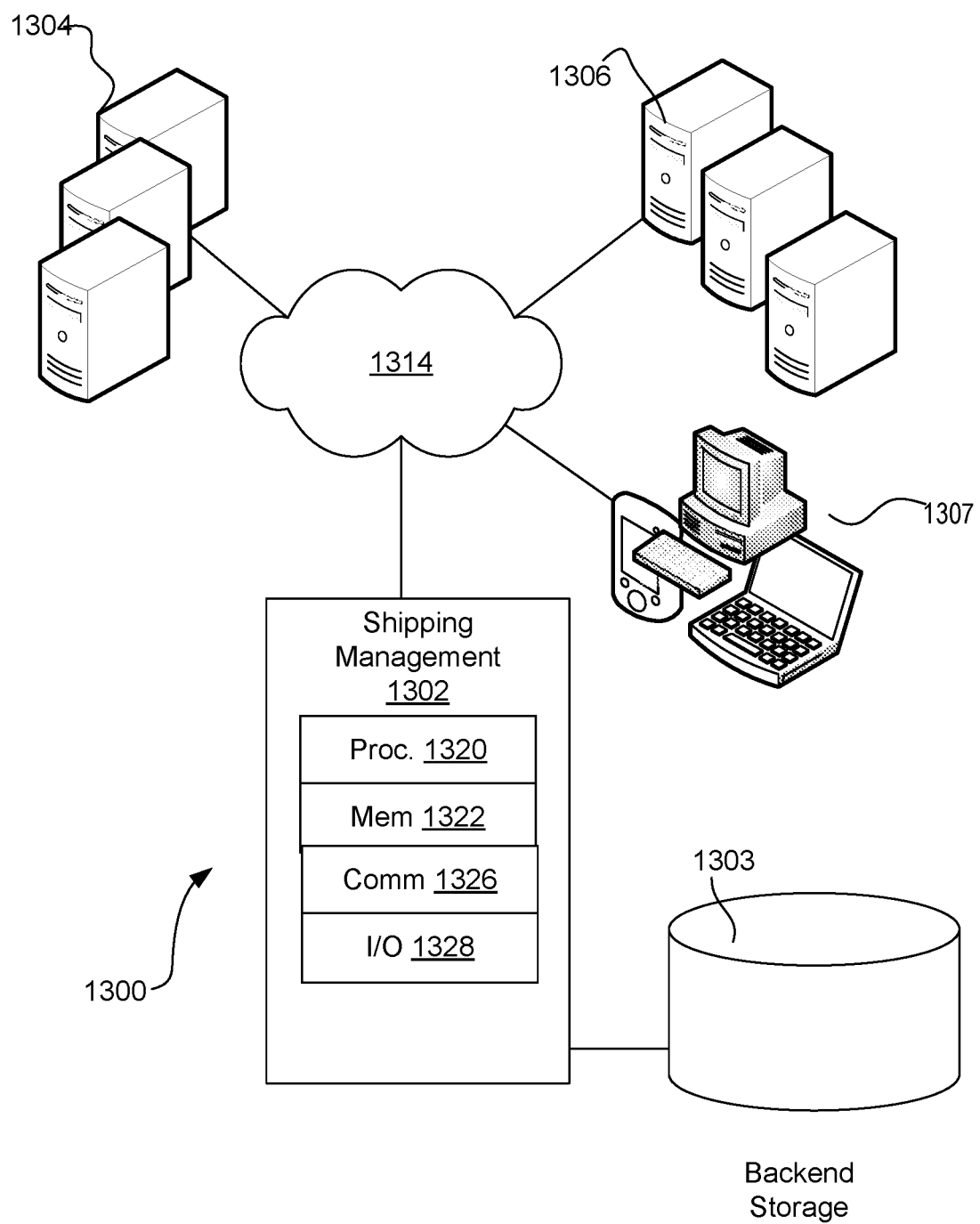
FIG. 13 is a diagrammatic representation of one embodiment of a distributed network computing environment.

FIG. 13 is diagrammatic representation of a distributed network computing environment 1300 where embodiments disclosed can be implemented. In the example illustrated, network computing environment 1300 includes network 1314 that can be bi-directionally coupled to shipping management platform system 1302, shipper computer systems 1304, carrier computer systems 1306, and recipient computer systems 1307. Network 1314 may represent a combination of wired and wireless networks that network computing environment 1300 may utilize for various types of network communications known to those skilled in the art. Shipping management platform system 1302 can be bi-directionally coupled to a data store 1303 storing a searchable collection of normalized shipping records, associated event records, shipper digital assets, scheduling records, rules and mappings.

For the purpose of illustration, a single system is shown for shipping management platform system 1302. However, shipping management platform system 1302 may comprise a plurality of computers (not shown) interconnected to each other over network 1314.

Shipping management platform system 1302 may include, for example, a computer processor 1320 and associated memory 1322. Computer processor 1320 may be an integrated circuit for processing instructions. For example, processor 1320 may comprise one or more cores or microcores of a processor. Memory 1322 may include volatile memory, non-volatile memory, semi-volatile memory, or a combination thereof. Memory 1322, for example, may include RAM, ROM, flash memory, a hard disk drive, a solid-state drive, an optical storage medium (e.g., CD-ROM), or other computer readable memory or combination thereof. Memory 1322 may implement a storage hierarchy that includes cache memory, primary memory, or secondary memory. In some embodiments, memory 1322 may include storage space on a data storage array. Shipping management platform system 1302 may also include I/O devices 1326 and a communication interface 1328, such as a network interface card, to interface with network 1314. Memory 1322 may store instructions executable by processor 1320. For example, memory 1322 may include code for a shipping management application, a data ingestion engine, or other code executable to provide a shipping management platform, such as shipping management platform 110, or component thereof. For the sake of brevity, shipping management computer system 1302 is illustrated as having one of each of the hardware components, even if more than one may be used.

Those skilled in the relevant art will appreciate that the invention can be implemented or practiced with other computer system configurations including, without limitation, multi-processor systems, network devices, mini-computers, mainframe computers, data processors, and the like. Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machine. Examples of a non-transitory computer readable medium are provided below in this disclosure.

Although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a set of distributed computers communicatively coupled to a network (for example, the Internet). Any suitable programming language can be used to implement the routines, methods, or programs of embodiments of the invention described herein, including R, Python, C, C++, Java, JavaScript, HTML, or any other programming or scripting code, etc. Other software/hardware/network architectures may be used. Communications between computers implementing embodiments can be accomplished using any electronic, optical, radio frequency signals, or other suitable methods and tools of communication in compliance with known network protocols.

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed:

1. A system for facilitating delivery appointment scheduling with outsourced carrier systems, comprising:
    a computer memory storing:
        digital assets visually corresponding to a plurality of shippers,
        data associating a shipment with a carrier from a plurality of carriers, a shipper from the plurality of shippers, and a recipient from a plurality of recipients, and
        a set of carrier-specific status mappings that map a set of carrier-specific status codes for the plurality of carriers to a delivery scheduling requirement; and
    a processor interfaced with the computer memory and configured to execute computer-readable instructions to cause the processor to:
        receive a carrier-specific status code associated with the shipment,
        determine, based on the carrier-specific status code associated with the shipment and the set of carrier-specific status mappings, that a delivery appointment is required for the shipment,
        query a carrier computer system of the carrier associated with the shipment to determine that delivery appointment scheduling is available for the shipment,
        automatically generate and transmit, to a computing system associated with the recipient, a communication (i) indicating that a delivery appointment for the shipment is required, and (ii) comprising a selection for scheduling the delivery appointment,
        determine that the selection for scheduling the delivery appointment was selected,
        obtain, from the carrier computer system, delivery scheduling information for the shipment,
        dynamically generate and transmit, to the computing system associated with the recipient, an interface that (i) displays information associated with the shipment and a first digital asset, of the digital assets, that visually corresponds to the shipper associated with the shipment, (ii) enables a user to select a delivery time slot based on the delivery scheduling information, and (iii) has a look and feel consistent with a presence of the shipper,
        receive, from the computing system associated with the recipient, a selection of the delivery time slot, and
        communicate with the carrier computer system to schedule delivery of the shipment to the recipient according to the delivery time slot.

2. The system of claim 1, wherein the communication further indicates the shipper, the carrier, and the shipment.

3. The system of claim 1, wherein the processor is configured to execute the computer-readable instructions to further cause the processor to:
    determine a notification channel associated with the shipment, and
    populate, with the communication, a template associated with the notification channel, wherein the communication is transmitted via the notification channel.

4. The system of claim 3, wherein to determine the notification channel associated with the shipment, the processor is configured to:
    determine, from a record associated with the shipment, the notification channel associated with the shipment.

5. The system of claim 1, wherein the digital assets may comprise one or more of: a set of electronic message templates, a set of web page templates, or a set of images.

6. The system of claim 1, wherein the processor is configured to execute the computer-readable instructions to further cause the processor to:

generate and transmit, to the computing system associated with the recipient, an additional communication indicating at least the shipper and the delivery time slot.

7. The system of claim 1, wherein the interface enables the user to select the delivery time slot, from a plurality of available time slots, using a time slot selector tool.

8. A computer-implemented method of facilitating delivery appointment scheduling with outsourced carrier systems, the method comprising:

receiving, by at least one processor, a carrier-specific status code associated with a shipment;

determining, by the at least one processor and based on the carrier-specific status code associated with the shipment and a set of carrier-specific status mappings that map a set of carrier-specific status codes to a delivery scheduling requirement, that a delivery appointment is required for the shipment;

interfacing, by the at least one processor, with a carrier computer system of a carrier associated with the shipment to determine that delivery appointment scheduling is available for the shipment;

automatically generating and transmitting, by the at least one processor to a computing system associated with the recipient, a communication (i) indicating that a delivery appointment for the shipment is required, and (ii) comprising a selection for scheduling the delivery appointment;

determining, by the at least one processor, that the selection for scheduling the delivery appointment was selected;

obtaining, by the at least one processor from the carrier computer system, delivery scheduling information for the shipment;

dynamically generating and transmitting, by the at least one processor to the computing system associated with the recipient, an interface that (i) displays information associated with the shipment and a first digital asset, of the digital assets, that visually corresponds to a shipper associated with the shipment, (ii) enables a user to select a delivery time slot based on the delivery scheduling information, and (iii) has a look and feel consistent with a presence of the shipper;

receiving, by the at least one processor from the computing system associated with the recipient, a selection of the delivery time slot; and communicating, by the at least one processor, with the carrier computer system to schedule delivery of the shipment to the recipient according to the delivery time slot.

9. The computer-implemented method of claim 8, wherein the communication further indicates the shipper, the carrier, and the shipment.

10. The computer-implemented method of claim 8, further comprising:

determining, by the at least one processor, a notification channel associated with the shipment; and populating, with the communication, a template associated with the notification channel, wherein the communication is transmitted via the notification channel.

11. The computer-implemented method of claim 10, wherein determining the notification channel associated with the shipment comprises:

determining, by the at least one processor from a record associated with the shipment, the notification channel associated with the shipment.

12. The computer-implemented method of claim 8, wherein the digital assets may comprise one or more of: a set of electronic message templates, a set of web page templates, or a set of images.

13. The computer-implemented method of claim 8, further comprising:

generate and transmit, to the computing system associated with the recipient, an additional communication indicating at least the shipper and the delivery time slot.

14. The computer-implemented method of claim 8, wherein the interface enables the user to select the delivery time slot, from a plurality of available time slots, using a time slot selector tool.

15. A non-transitory computer-readable storage medium configured to store instructions executable by one or more processors, the instructions comprising:

instructions for receiving a carrier-specific status code associated with a shipment;

instructions for determining, based on the carrier-specific status code associated with the shipment and a set of carrier-specific status mappings that map a set of carrier-specific status codes to a delivery scheduling requirement, that a delivery appointment is required for the shipment;

instructions for interfacing with a carrier computer system of a carrier associated with the shipment to determine that delivery appointment scheduling is available for the shipment;

instructions for automatically generating and transmitting, to a computing system associated with the recipient, a communication (i) indicating that a delivery appointment for the shipment is required, and (ii) comprising a selection for scheduling the delivery appointment;

instructions for determining that the selection for scheduling the delivery appointment was selected;

instructions for obtaining, from the carrier computer system, delivery scheduling information for the shipment;

instructions for dynamically generating and transmitting, to the computing system associated with the recipient, an interface that (i) displays information associated with the shipment and a first digital asset, of the digital assets, that visually corresponds to the shipper associated with the shipment, (ii) enables a user to select a delivery time slot based on the delivery scheduling information, and (iii) has a look and feel consistent with a presence of the shipper;

instructions for receiving, from the computing system associated with the recipient, a selection of the delivery time slot; and instructions for communicating with the carrier computer system to schedule delivery of the shipment to the recipient according to the delivery time slot.

16. The non-transitory computer-readable storage medium of claim 15, wherein the instructions further comprise:

instructions for determining a notification channel associated with the shipment; and instructions for populating, with the communication, a template associated with the notification channel, wherein the communication is transmitted via the notification channel.

17. The non-transitory computer-readable storage medium of claim 16, wherein the instructions for determining the notification channel associated with the shipment comprise:
   instructions for determining, from a record associated with the shipment, the notification channel associated with the shipment.

18. The non-transitory computer-readable storage medium of claim 15, wherein the digital assets may comprise one or more of: a set of electronic message templates, a set of web page templates, or a set of images.

19. The non-transitory computer-readable storage medium of claim 15, wherein the instructions further comprise:
   instructions for generate and transmit, to the computing system associated with the recipient, an additional communication indicating at least the shipper and the delivery time slot.

20. The non-transitory computer-readable storage medium of claim 15, wherein the interface enables the user to select the delivery time slot, from a plurality of available time slots, using a time slot selector tool.

\* \* \* \* \*